US010293320B2

(12) United States Patent
Watanabe et al.

(10) Patent No.: US 10,293,320 B2
(45) Date of Patent: May 21, 2019

(54) METHOD FOR PRODUCING A PARTICLE CONTAINING POROUS SILICA, POROUS SILICA, AND A PARTICLE CONTAINING POROUS SILICA

(75) Inventors: Hiroto Watanabe, Tokyo (JP); Hiroaki Imai, Yokohama (JP); Yuya Oaki, Yokohama (JP)

(73) Assignee: Tokyo Metropolitan Industrial Technology Research Institute, Tokyo (JP)

( * ) Notice: Subject to any disclaimer, the term of this patent is extended or adjusted under 35 U.S.C. 154(b) by 521 days.

(21) Appl. No.: 14/241,589

(22) PCT Filed: Aug. 28, 2012

(86) PCT No.: PCT/JP2012/071699
§ 371 (c)(1),
(2), (4) Date: May 1, 2014

(87) PCT Pub. No.: WO2013/031767
PCT Pub. Date: Mar. 7, 2013

(65) Prior Publication Data
US 2014/0295178 A1    Oct. 2, 2014

(30) Foreign Application Priority Data

Aug. 29, 2011 (JP) ................................. 2011-185806
Aug. 27, 2012 (JP) ................................. 2012-186879

(51) Int. Cl.
*B01J 8/00*       (2006.01)
*B01J 35/00*      (2006.01)
(Continued)

(52) U.S. Cl.
CPC .............. *B01J 8/008* (2013.01); *B01J 21/08* (2013.01); *B01J 21/18* (2013.01); *B01J 23/22* (2013.01);
(Continued)

(58) Field of Classification Search
CPC ................................. B01J 8/008; B01J 35/002
See application file for complete search history.

(56) References Cited

U.S. PATENT DOCUMENTS

| 4,465,889 A | 8/1984 | Anthony et al. |
| 5,922,299 A | 7/1999 | Bruinsma et al. |

(Continued)

FOREIGN PATENT DOCUMENTS

| CN | 101244391 A | 8/2008 |
| JP | 58-156508 A | 9/1983 |

(Continued)

OTHER PUBLICATIONS

Fukuoka et al(Template Synthesis of Nanoparticle Arrays of Gold and Platinum in Mesoporous Silica Films, Nano Letters (2002) vol. 2, No. 7, pp. 793-795).*

(Continued)

*Primary Examiner* — Melvin C. Mayes
*Assistant Examiner* — Michael Forrest
(74) *Attorney, Agent, or Firm* — McCormick, Paulding & Huber LLP

(57) ABSTRACT

Provided is a process for producing satisfactory particles held in porous silica. The process comprises (a) the step of preparing porous silica, (b) the step of bringing the porous silica into contact with a liquid which contains either a metal or a compound that has the metal as a component element and infiltrating the liquid into the pores of the porous silica, and (c) the step of subjecting, after the step (b), the impregnated porous silica to a heat treatment to thereby form fine particles comprising the metal or the metal compound in the pores of the porous silica. When porous silica is synthesized by hydrolyzing an alkoxysilane in a solvent-free system, it is possible to synthesize porous silica having a fine pore diameter. Use of this porous silica as a template facilitates (Continued)

formation of particles (e.g., W, Cu, Cr, Mn, Fe, Co, or Ni or an oxide of any of these metals) that show peculiar properties not observed in the bulk material.

3 Claims, 22 Drawing Sheets

(51) Int. Cl.

| | |
|---|---|
| C09C 1/30 | (2006.01) |
| B01J 21/08 | (2006.01) |
| B01J 21/18 | (2006.01) |
| B01J 23/22 | (2006.01) |
| B01J 23/26 | (2006.01) |
| B01J 23/30 | (2006.01) |
| B01J 23/34 | (2006.01) |
| B01J 23/50 | (2006.01) |
| B01J 23/52 | (2006.01) |
| B01J 23/72 | (2006.01) |
| B01J 23/74 | (2006.01) |
| B01J 23/75 | (2006.01) |
| B01J 35/10 | (2006.01) |
| B01J 37/00 | (2006.01) |
| B01J 37/02 | (2006.01) |
| B01J 37/03 | (2006.01) |
| B01J 37/08 | (2006.01) |
| C01B 33/18 | (2006.01) |
| C01B 33/12 | (2006.01) |
| B01J 23/745 | (2006.01) |
| B01J 23/755 | (2006.01) |
| B82Y 30/00 | (2011.01) |
| C01B 32/05 | (2017.01) |
| B01J 37/12 | (2006.01) |
| B01J 37/34 | (2006.01) |
| B82Y 40/00 | (2011.01) |

(52) U.S. Cl.
CPC .............. *B01J 23/26* (2013.01); *B01J 23/30* (2013.01); *B01J 23/34* (2013.01); *B01J 23/50* (2013.01); *B01J 23/52* (2013.01); *B01J 23/72* (2013.01); *B01J 23/74* (2013.01); *B01J 23/745* (2013.01); *B01J 23/75* (2013.01); *B01J 23/755* (2013.01); *B01J 35/002* (2013.01); *B01J 35/004* (2013.01); *B01J 35/1023* (2013.01); *B01J 35/1028* (2013.01); *B01J 35/1038* (2013.01); *B01J 35/1042* (2013.01); *B01J 35/1057* (2013.01); *B01J 35/1061* (2013.01); *B01J 35/1085* (2013.01); *B01J 37/0018* (2013.01); *B01J 37/0201* (2013.01); *B01J 37/033* (2013.01); *B01J 37/08* (2013.01); *B82Y 30/00* (2013.01); *C01B 32/05* (2017.08); *C01B 33/124* (2013.01); *C01B 33/18* (2013.01); *C09C 1/3045* (2013.01); *B01J 37/12* (2013.01); *B01J 37/346* (2013.01); *B01J 2208/00805* (2013.01); *B01J 2208/00946* (2013.01); *B82Y 40/00* (2013.01); *C01P 2004/51* (2013.01); *C01P 2004/52* (2013.01); *C01P 2004/64* (2013.01); *C01P 2006/42* (2013.01); *Y10S 977/776* (2013.01); *Y10S 977/777* (2013.01); *Y10T 428/268* (2015.01); *Y10T 428/2982* (2015.01)

(56) References Cited

U.S. PATENT DOCUMENTS

| | | |
|---|---|---|
| 2002/0127498 A1 | 9/2002 | Doshi et al. |
| 2004/0238901 A1 | 12/2004 | Balkenende et al. |
| 2006/0041172 A1 | 2/2006 | Pirutko et al. |
| 2011/0196184 A1 | 8/2011 | Popp et al. |
| 2012/0192762 A1 | 8/2012 | Yabe et al. |

FOREIGN PATENT DOCUMENTS

| | | | | |
|---|---|---|---|---|
| JP | 9-100122 A | 4/1997 | | |
| JP | 2001-104799 A | 4/2001 | | |
| JP | 2004035368 A | * 2/2004 | ............ | C01B 37/02 |
| JP | 2005-139376 A | 6/2005 | | |
| JP | 2006-306707 A | * 11/2006 | | |
| JP | 2008150696 A | 7/2008 | | |
| JP | 2009-173478 A | 8/2009 | | |
| JP | 2010-37150 A | 2/2010 | | |
| WO | 2010/049715 A1 | 5/2010 | | |
| WO | 2010/097108 A1 | 9/2010 | | |
| WO | 2011016277 A1 | 2/2011 | | |

OTHER PUBLICATIONS

Beck et al (Molecular or Supramolecular Templating: Defining the Role of Surfactant Chemistry in the Formation of Microporous and Mesoporous Molecular Sieves, Chem Mater. 1994, 6, 1816-1821).*

Wakayama et al (Size-Controlled Synthesis and Catalytic Performance of Pt Nanoparticles in Micro- and Mesoporous Silica Prepared Using Supercritical Solvents, Adv Mater. 2003, 15, No. 9, pp. 742-745).*

Kruk et al(Metamorphosis of Ordered Mesopores to Micropores: Periodic Silica with Unprecedented Loading of Pendant Reactive Organic Groups Transforms to Periodic Microporous Silica with Tailorable Pore Size, J. Am. Chem. Soc. 2002, 124, 6383-6392).*

Korean Office Action for Korean Application No. 10-2014-7004939 dated May 27, 2015 and its English Translation.

Supplementary Partial European Search Report for European Application No. EP12828309 dated Sep. 1, 2015.

"Synthesis, Structure and Acid Characteristics of Partially Crystalline Silicalite-1 Based Materials" by Yin Fong Yeong et al. Microporous and Mesoporous Materials, Elsevier Science Publishing, New York, US, vol. 123, No. 1-3, Jul. 1, 2009. pp. 129-139.

"In Situ Solid-State NMR Investigations of the Vapor-Phase Beckmann Rearrangement of 15N-cyclohexanone Oxime on MFI-type Zeolites and Mesoporous SBA-15 Materials in the Absence and Prescence of the Additive 13C-methanol" by V.R. Reddy Marthala et al. Journal of Catalysis, Academic Press, Duluth, MN, US, vol. 257, No. 1, Jul. 1, 2008. pp. 134-141.

"Manganese Modified Zeolite Silicalite-1 as Polysulphide Sorbent in Lithium Sulphur Batteries" by Vida Lapornik et al. Journal of Power Sources, Elsevier SA, CH, vol. 274 Oct. 30, 2014. pp. 1239-1248.

"Synthesis of Highly Ordered Supermicroporous Silica Using Short-Chain cationic Trimeric Surfactant as Structure-Directing Agent" by Yuanyuan Sun et al. J Porous Materials, Kluwer Academic Publishers, BO, vol. 17, No. 5, Sep. 22, 2009. pp. 597-603.

"Mesoporous Material Formed by Acidic Hydrothermal Assembly of Silicalite-1 Precursor Nanoparticles in the Absence of Meso-Templates" by Wesley J.J. Stevens et al. Microporous and Mesoporous Materials, Elsevier Science Publishing, New York, vol. 110, No. 1, Feb. 8, 2008 p. 77-85.

Extended European Search Report for European Patent Application No. 12 82 8309 dated Dec. 1, 2015.

Article entitled "Nanometer-Sized Semiconductor Clusters: Materials Synthesis, Quantum Size Effects, and Photophysical Properties", Y. Wang, et al., Phys. Chem. 1991, 95 pp. 525-532.

Article entitled "Electronic Wave Functions in Semiconductor Clusters: Experiment and Theory" by Louis Brus, Phys. Chem.. 1986, 90, pp. 2555-2560.

Article entitled "Colloids and Surfaces A: Physicochemical and Engineering Aspects; Highly monodisperse and sub-nano silver particles synthesis via microemulsion technique" by Jignasa N. Solanki et al.; 2010, 359, pp. 31-38.

Article entitled "Electrochemistry Communications: Photocatalysis of Au25-modified TiO2 under visible and near infrared light" by Atsushi Kogo, et al., 2010,12, pp. 996-999.

(56) References Cited

OTHER PUBLICATIONS

Article entitled "Structure and Magnetization of Small Monodisperse Platinum Clusters" by Xiong Liu, et al.; Phys. Rev. Lett. 2006, 97, pp. 253401-1 to 253401-4.

Article entitled "Synthesis of photoluminescent carbogenic dots using mesoporous silica spheres as nanoreactors" by Jie Zong, et al.; Chem. Commun., 2011, 47, pp. 764-766.

Article entitled "One-step synthesis of fluorescent carbon nanoparticles by laser irradiation" by Sheng-Liang Hu, et al.; Journal of Materials Chemistry, 2009, 94, pp. 484-488.

Article entitled "Glutathione-Protected Gold Clusters Revisited: Bridging the Gap between Gold(I)-Thiolate Complexes and Thiolate-Protected Gold Nanocrystals" by Yuichi Negishi, et al; American Chemical Society, 2005, 127, pp. 5261-5270.

Article entitled "Quantum size effect in TiO2 nanoparticles prepared by finely controlled metal assembly on dendrimer templates" by Norifusa Satoh, et al.; Nature Publishing Company, 2008, 3, pp. 106-111.

Article entitled "Smart Zeolites: New Forms of Tungsten and Molybdenum Oxides" by Geoffrey A. Ozin, et al.; Acc. Chem. Res, 1992. 25, pp. 553-560.

Article entitled "Enhanced photocatalytic activity of quantum-confined tungsten trioxide nanoparticles in mesoporous silica" by Daisuke Tanaka, et al.; Chem. Commun., 2010, 46, pp. 5286-5288.

Article entitled "Molecular or Supramoletular Templating: Defining the Role of Surfactant Chemistry in the Formation of Microporous and Mesoporous Molecular Sieves" by J. S. Beck et al.; Chem. Mater. 1994, 6, pp. 1816-1821.

International Search Report for PCT Serial No. PCT/JP2012/071699 dated Nov. 16, 2012.

European Communication for Serial No. 12 828 309.0 dated Aug. 2, 2019.

* cited by examiner

METHOD FOR PRODUCING A PARTICLE CONTAINING POROUS SILICA, POROUS SILICA, AND A PARTICLE CONTAINING POROUS SILICA

CROSS-REFERENCE TO RELATED APPLICATION

This application is entitled to the benefit of and incorporations by reference subject matter disclosed in International Patent Application No. PCT/JP2012/071699 filed on Aug. 28, 2012 and from Japanese Patent Applications No. 2011-185806 filed on Aug. 29, 2011 and No. 2012-186879 filed on Aug. 27, 2012.

TECHNICAL FIELD OF THE INVENTION

The present invention relates to a method for producing a particle containing porous silica; porous silica; and a particle containing porous silica, and particularly, concerns a technique for introducing minute particles into pores of the porous silica.

BACKGROUND OF THE INVENTION

Materials such as metal, ceramics and carbon exhibit a peculiar characteristic which is not observed in a bulk state by reducing the particle diameter (Y. Wang, N. Herron, J. Phys. Chem., 1991, 95, 525). Moreover, experiments and theoretical predictions have reported that in many cases, the peculiar characteristic appears in single nano-meter size and maximizes in sub-nano meter size range (L. Brus, J. Phys. Chem., 1986, 90, 2555).

For example, metal sub-nano particles have been known that their metallic characteristics disappear and form a discrete band structure by reducing the particle size (J. N. Solanki, Z. V. P. Murthy, Colloids and Surfaces A: Physicochem. Eng. Aspects, 2010, 359, 31). This characteristic has been examined to be applied to a pigment sensitizing solar cell or the like in the next generation for this reason because a light absorption derived from the band structure exhibits a characteristic like a semiconductor or a pigment molecule (A. Kogo, N. Sakai, T. Tatsuma, Electrochemistry Communications, 2010, 12, 996). Since it shows peculiar phenomena such as light emission and magnetization, which is not observed in a bulk state, it is expected to apply to various fields (X. Liu, M. Bauer, H. Bertagnolli, E. Roduner, J. V. Slageren, F. Phillip, Phys. Rev. Lett., 2006, 97, 253401).

In the case of semiconductor ceramic materials such as metal oxides and sulfides, the band gap energy greatly increases by forming the material into sub-nano particles by quantum size effect (Y. Wang, N. Herron, J. Phys. Chem., 1991, 95, 525 and L. Brus, J. Phys. Chem., 1986, 90, 2555). The variable band gap energy is useful in the photo-catalyst field or the like, and has expected to drastically improve catalyst activities and reaction selectivity and to produce a reaction that has not been shown in a bulk state.

Recently nano carbon materials have been noticed. Carbon material also obtains peculiar characteristics by forming into sub-nano particles. Particularly, since phenomenon such as white-color light emission under irradiation by an ultraviolet ray and up-conversion light emission are never produced in a bulk carbon, currently it has been researched (J. Zong, Y. Zhu, X. Yang, J. Shen, C. Li, Chem. Commun., 2011, 47, 764).

The Non-Patent Documents such as S. L. Hu, K. Y. Niu, J. Sun, J. Yang, N. Q. Zhao and X. W. Du, J. Mater. Chem., 2009, 19, 484; Y. Negishi, K. Nobusada, T. Tsukuda, J. AM. CHEM. SOC., 2005, 127, 5261; N. Satoh, T. Nakashima, K. Kamikura, K. Yamamoto, Nature Nanotech., 2008, 3, 106; G. A. Ozin, S. Ozkar, R. A. Prokopowicz, Acc. Chem. Res., 1992, 25, 553; D. Tanaka, Y. Oaki, H. Imai, Chem. Commun., 2010, 46, 5286; and J. S. Beck, J. C. Vartuli, G. J. Kennedy, C. T. Kresge, W. J. Roth, S. E. Schramm, Chem. Mater., 1994, 6, 1816 have disclosed syntheses of minute particles such as metal which will be described later.

SUMMARY OF THE INVENTION

Inventors have extensively researched porous silica, a particle containing porous silica and porous silica with particles. The particle containing porous silica refers to a minute particle contained in the pores by using the porous silica. The minute particle refers to a particle contained in the pores of porous silica or a particle isolating from the pores.

Minute particle is formed in pores by using porous silica, the minute particle or the whole of porous silica with the minute particle can obtain various functions. The inventors have extensively researched to improve those functions.

Conventionally, the synthesis of minute particles, for example, sub-nano particles was carried out by method such as laser abrasion (S. L. Hu, K. Y. Niu, J. Sun, J. Yang, N. Q. Zhao and X. W. Du, J. Mater. Chem., 2009, 19, 484); however, the method has problems on productivity and size controlling.

On only metal particles, there are examples of synthesis in which interaction between the metal surface and a specific functional group such as thiol group is used (N. Satoh, T. Nakashima, K. Kamikura, K. Yamamoto, Nature Nanotech., 2008, 3, 106). However, this method also has problems on productivity and size controlling, and fails to be applied to wide groups of substances because the synthesis is limited only to metal particles.

Furthermore, there is a synthesis example utilizing a branch-shaped polymer (dendrimer) with a functional group of a ligand of a metal ion in its skeleton (N. Satoh, T. Nakashima, K. Kamikura, K. Yamamoto, Nature Nanotech., 2008, 3, 106). By controlling the characteristics of this dendrimer, nano to sub-nano meter particles with uniform particle sizes can be synthesized; however, problems are that the controllability deteriorates in the sub-nano meter range and the synthesis of a dendrimer causes complicated processes and so on.

A technique using a porous material, typically zeolite, as a template for particle synthesis is advantageous on simple synthesis and application to general substrate. Some reports disclosed on the sub-nano particle synthesis by zeolite as a template (A. Ozin, S. Ozkar, R. A. Prokopowicz, Acc. Chem. Res., 1992, 25, 553). However, generally, controllability of pores of zeolite is poor, and the problem is that bulky particles are undesirably grown in inner pores, that is, super cages.

Meanwhile, since pore diameter of meso-porous silica is easy to control, it is suitable for an appropriate template material for the synthesis of nano particles (D. Tanaka, Y. Oaki, H. Imai, Chem. Commun., 2010, 46, 5286). Another advantage is that produced particles are uniformly dispersed in the meso-porous silica of a superior adsorbing material. However, since conventional meso-porous silica was difficult to control the pore diameter to 1.5 nm or less, it was not used for synthesizing sub-nano particles (J. S. Beck, J. C.

Vartuli, G. J. Kennedy, C. T. Kresge, W. J. Roth, S. E. Schramm, Chem. Mater., 1994, 6, 1816).

As described above, although various methods have been proposed for the synthesis method for minute particles, since those methods have advantages and disadvantages, it was difficult to synthesize minute particles with high controllability.

Therefore, one object of the present invention is to provide a technique for improving the characteristics of a particle containing porous silica. Particularly, it is to provide a particle containing porous silica with superior particle-size distribution property and excellent characteristics.

Another object of the present invention is to provide method for producing an excellent particle containing porous silica. On a material for particles, the object is to provide method for producing a particle containing porous silica which can be applied to a wide range of materials.

The above objects and the other objects and novel features of the present invention will appear from the detailed description of the present specification and attached drawings.

The following is outlines of typical embodiments of the present inventions.

A typical embodiment of the present inventions relates to a method for producing a particle containing porous silica comprising the following steps: (a) preparing porous silica; (b) contacting the porous silica with solution containing a metal or a compound comprising the metal as a component element and thereby, impregnating pores of the porous silica with the solution; and (c) forming a minute particle containing the metal or the metal compound in the pores of the porous silica by heat treatment after the step (b), wherein an average pore diameter of the porous silica is 0.5 nm or more to 1.5 nm or less.

A typical embodiment of the present inventions relates to a method for producing a particle containing porous silica comprising the following steps: (a) preparing porous silica; (b) contacting the porous silica with solution containing a carbon or a compound comprising carbon as a component element and thereby, impregnating pores of the porous silica with the solution; and (c) forming a minute particle containing the carbon or the carbon compound in the pores of the porous silica by heat treatment after the step (b), wherein an average pore diameter of the porous silica is 0.5 nm or more to 1.5 nm or less.

A typical embodiment of the present inventions relates to a method for producing a particle containing porous silica comprising the following steps: (a) preparing porous silica; (b) contacting the porous silica with mixed solution of first solution containing bismuth or a compound comprising bismuth as a component element and second solution containing vanadium or a compound comprising vanadium as a component element and thereby, impregnating pores of the porous silica with the mixed solution; and (c) forming a minute particle containing bismuth vanadate in the pores of the porous by heat treatment silica after the step (b), wherein an average pore diameter of the porous silica is 0.5 nm or more to 1.5 nm or less.

A typical embodiment of the present inventions relates to a method for producing a particle containing porous silica comprising the following steps: (a) preparing porous silica; (b) contacting the porous silica with a gas containing metal or a compound comprising the metal as a component element so as to introduce the gas into the pores of the porous silica, thereby forming minute particles containing the metal or the metal compound into the pores of the porous silica, wherein an average pore diameter of the porous silica is 0.5 nm or more to 1.5 nm or less.

A typical embodiment of the present inventions relates to a method for producing a particle containing porous silica comprising the following steps: (a) producing porous silica by hydrolysis of alkoxy silane comprising the following steps: (a1)) mixing a surfactant and alkoxy silane to form mixed solution; (a2) hydrolyzing the alkoxy silane by adding water to the mixed solution; and (a3) removing the surfactant by heat treatment after the (a2) process; and (b) synthesizing the particle in the pores of porous silica produced in the step (a), wherein the step (b) is contacting the porous silica with solution or gas containing a particle material or a compound comprising the particle material as a component element so as to introduce pores of the porous silica with the solution or gas and thereby, forming the particle containing the particle material or the particle material compound in the pores of the porous silica.

A typical embodiment of the present inventions relates to a porous silica comprising pores of which average pore diameter is from 0.5 nm or more to 1.5 nm or less, with particles containing any one of the metal, the metal compound and carbon.

A typical embodiment of the present inventions relates to a method for producing a particle containing porous silica comprising the following steps: (a) preparing porous silica; (b) contacting the porous silica with solution containing metal or a compound comprising the metal as a component element and thereby, impregnating pores of the porous silica with the solution; and (c) forming a minute particle containing the metal or the metal compound in the pores of the porous silica by heat treatment after the step (b).

A typical embodiment of the present inventions relates to a method for producing a particle containing porous silica comprising the following steps: (a) preparing porous silica; (b) contacting the porous silica with solution containing metal or a compound comprising the metal as a component element and thereby, impregnating pores of the porous silica with the solution; (c) forming a minute particle containing the metal oxide in the pores of the porous silica by heat treatment after the step (b); and (d) forming a minute particle of the metal by reduction of the minute particle containing the metal oxide after the step (c).

A typical embodiment of the present inventions relates to a method for producing a particle containing porous silica comprising the following steps: (a) preparing porous silica; (b) contacting the porous silica with solution containing metal or a compound comprising the metal as a component element and thereby, impregnating pores of the porous silica with the solution; (c) forming a minute particle of the metal by reduction of the solution in the pores of the porous silica after the step (b).

A typical embodiment of the present inventions relates to a method for producing a particle containing porous silica comprising the following steps: (a) preparing porous silica; (b) contacting the porous silica with solution containing a carbon or a compound comprising the carbon as a component element and thereby, impregnating pores of the porous silica with the solution; and (c) forming a minute particle containing the carbon or the carbon compound in the pores of the porous silica by heat treatment after the step (b), wherein light-emission wavelength of the minute particle is adjusted by controlling an average pore diameter of the porous silica.

The typical embodiments of the particle containing porous silica of the present invention can improve characteristics thereof.

Moreover, a desirable particle containing porous silica is produced by typical embodiments of method for producing a particle containing porous silica of the present invention.

BRIEF DESCRIPTIONS OF THE DRAWINGS

DESCRIPTIONS OF THE PREFERRED EMBODIMENTS

Figure 1A:
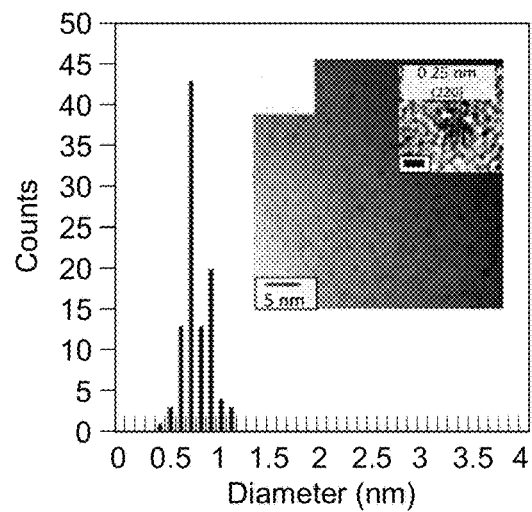
FIGS. 1A-1C show an image of a transmission-type electron microscope (TEM image) of porous silica containing tungsten oxide obtained in example 1 and a distribution (graph) of particle diameters of the tungsten oxide.

Embodiments of the present invention will be described in detail with figures. Members with the same functions are indicated by the same or related reference numerals, and overlapped explanations will be omitted.

Embodiment 1

<1> Synthesis of Porous Silica

Porous silica is synthesized by sol-gel method using a surfactant as a template. This synthesis method may be referred to as a molecule template method (template method).

Generally, when a surfactant is dissolved in a solution, for example, tube-shaped micelle particles are formed depending on the kind and concentration of the surfactant. In this case, when tetraethoxy silane or the like forming a silica source is added to the solution, adsorption and growing reactions of silicate ions proceed among micelle particles and a silica gel skeleton is formed. Since a sol state is changed to a gel state by these adsorption and growing reactions of silicate ions, these reactions are referred to as a sol-gel reaction. Then, when a baking (heating treatment) process is carried out thereon, the surfactant served as a template is decomposed and removed and then, porous silica is obtained. That is, a silica skeleton with a plurality of pores (fine pores and micro pores) is obtained.

In this embodiment, the porous silica can be synthesized with high controllability by the sol-gel reaction in a solvent-free system. The term "solvent-free system" refers to a solvent used for mixing alkoxy silane and a surfactant; a solvent preliminarily dissolving alkoxy silane and dissolving the surfactant for easy mix these materials; or a large amount of solvent (50 equivalents or more) for adding to a mixed solution of the alkoxy silane and the surfactant. The porous silica is synthesized with excellent controllability by directly mixing alkoxy silane and a surfactant without such the solvent and by adding a required amount of water ($H_2O$) as a reaction agent.

A synthesizing method for porous silica of this embodiment is described in detail below.

Alkoxy silane and a cationic surfactant are mixed and stirred. A precursor solution is formed by adding water to the mixed solution and stirring. This precursor solution has gradually gelled by stirring.

The added water ($H_2O$) contributes as a reaction agent for hydrolyzing the alkoxy silane. The pH of the added water is desirably adjusted to about 2 of the isoelectric point of alkoxy silane. This is because at the isoelectric point, the hydrolyzing of alkoxy silane and the gelation rate of silicate ions are the slowest and it can be sufficiently ensured the time for micelle formation of the surfactant.

Moreover, the hydrolyzing process is accelerated at around pH 0 to 1 of water and the same effect can be obtained because of the sufficiently slow gelation rate of silicate ions. For this reason, the pH of the added water is preferably adjusted to 0 to 2. In the case of 3 or more, the hydrolyzing reaction and the gelation rate are too fast, and it may be difficult to sufficiently ensure time for dissolution of the surfactant and the micelle formation.

An acid for adjusting the pH may include an inorganic acid such as hydrochloric acid, sulfuric acid, nitric acid, or an organic acid such as acetic acid.

To improve the moldability of the porous silica, its hydrolysis is preferably carried out by an amount of solvent as less as possible. Therefore, the added amount of water to alkoxy silane is preferably set from 2 equivalents (eq), the minimum level required for the reaction to 20 equivalents or less, more preferably, from 2 equivalents or more to 10 equivalents or less. By the system of less amount of solvent, the reaction system can be maintained as a mixture between virtually pure silicate ions and the surfactant; and the sol-gel reaction can be accelerated by maintaining the stability of micelle particles of the surfactant forming a template. For example, porous silica can be synthesized even by a surfactant with carbon atoms of 8 or less, described later. Therefore, it can be used porous silica of which average pore diameter (average pore size, average pore diameter, D) is smaller. That is, the pore size of the porous silica can be easily adjusted by adjusting the number of carbon atoms of the surfactant.

The cationic surfactant may include a surfactant represented by a general formula, $R_1R_2R_3R_4N^+X^-$; $R_1$ represents, for example, an alkyl group, a benzyl group or a phenyl group, having 1 to 24 carbon atoms, and each of $R_2$, $R_3$ and $R_4$ represents, for example, a methyl group, an ethyl group, a propyl group or a butyl group; X represents, for example, a halogen ion such as F, Cl, Br or I. Preferable cationic surfactant is a quaternary cationic surfactant. An alkyl group represented by $R_1$ may be a straight chain or a branch.

The following will explain this embodiment based upon examples in detail; however, the present invention is not limited by these examples.

(Example A) Synthesis of Porous Silica

After tetraethoxy silane (TEOS) (8 g) (0.038 mol; 1 eq) as a silica source and put to a polypropylene container, a cationic surfactant (0.2 to 1.2 eq) (0.038 mol×0.2 to 0.038 mol×1.2) was added, and then, dispersed and stirred. At this time, TEOS and the surfactant are not mixed, that is, the solution is not uniformed. Eight kinds of materials of the cationic surfactant, octadecyltrimethyl ammonium chloride (C18TAC), hexadecyltrimethyl ammonium chloride (C16TAC), tetradecyltrimethyl ammonium bromide (C14TAB), dodecyltrimethyl ammonium bromide (C12TAB), decyltrimethyl ammonium bromide (C10TAB), octyltrimethyl ammonium bromide (C8TAB), hexyltrimethyl ammonium bromide (C6TAB) and butyltrimethyl ammonium chloride (C4TAC) were used to synthesize respective porous silicas.

Next, water of which pH was adjusted to about 0 to 2 by hydrochloric acid (about 2 to 4 eq) (0.038 mol×2 to 0.038 mol×4) was added to the above mixed solution, and stirred at room temperature. After stirring for about 1 hour, the TEOS was hydrolyzed and a virtually uniform solution was obtained. This solution (precursor solution) was kept at room temperature or 60° C., and continuously stirred or still stood. Gelation was completed from 12 hours to several days, and a visually colorless transparent gel was obtained from the entire solution. This gel was dried at 60° C., and baked at 600° C. for 3 hours to remove the surfactant, and then, colorless transparent monolithic porous silica was obtained.

Thus, the synthesis of silica can be accelerated by the reaction system of a high concentration silicate ionic solution as the precursor solution without inhibiting the micelle formation of the surfactant by solvent molecules or the like. Particularly, the micelle can be formed even by a surfactant with a small number of carbon atoms (for example, 7 or less) which was conventionally difficult to be applied, and thus, porous silica containing micro pores can be formed.

The pores of the porous silica obtained were analyzed. The specific surface area (SSA), pore volume (TPV) and the average pore diameter (D) were measured. The specific surface area (SSA) was measured by BET method. The average pore diameter was measured by BJH method, HK method, GCMG method or the like. A finer pore diameter of average pore diameter can be calculated (analyzed) by HK method better than BJH method. A finer pore diameter can be calculated (analyzed) by GCMG method better than HK method.

On porous silica (C18) of C18TAC, the BET specific surface area was 1361 $m^2/g$, and the pore volume was 0.96 $cm^3/g$. The average pore diameter was 3.00 nm in BJH method, 3.36 nm in HK method and 3.27 nm in GCMG method.

On porous silica (C16) of C16TAC, the BET specific surface area was 1452 $m^2/g$, and the pore volume was 0.79 $cm^3/g$. The average pore diameter was 2.70 nm in BJH method, 2.86 nm in HK method and 2.82 nm in GCMG method.

On porous silica (C14) of C14TAB, the BET specific surface area was 1234 $m^2/g$, and the pore volume was 0.60 $cm^3/g$. The average pore diameter was 2.40 nm in HK method and 2.26 nm in GCMG method.

On porous silica (C12) of C12TAB, the BET specific surface area was 1056 $m^2/g$, and the pore volume was 0.53 $cm^3/g$. The average pore diameter was 2.00 nm in HK method and 1.82 nm in GCMG method.

On porous silica (C10) of C10TAB, the BET specific surface area was 916 $m^2/g$, and the pore volume was 0.45 $cm^3/g$. The average pore diameter was 1.60 nm in HK method and 1.58 nm in GCMG method.

On porous silica (C8) of C8TAB, the BET specific surface area was 810 $m^2/g$, and the pore volume was 0.41 $cm^3/g$. The average pore diameter was 1.28 nm in GCMG method.

On porous silica (C6) of C6TAB, the BET specific surface area was 632 $m^2/g$, and the pore volume was 0.32 $cm^3/g$. The average pore diameter was 1.12 nm in GCMG method.

On porous silica (C4) of C4TAB, the BET specific surface area was 586 $m^2/g$, and the pore volume was 0.29 $cm^3/g$. The average pore diameter was 0.92 nm in GCMG method.

Thus, the porous silica containing pores corresponding to a chain length was obtained. It is found that the number of carbon atoms is lowered from 18 to 4 while the average pore diameter (D) becomes smaller. Particularly, when a surfactant with carbon atoms of 12 or less was used to the porous silica, its average pore diameter was observed to 2 nm or less and micro pores. Even if a surfactant with carbon atoms of 7 or less which has been conventionally difficult to be used for the synthesis is used, porous silica can be synthesized. The average pore diameter of porous silica of C6TAB with carbon atoms of 6 was 1.12 nm in GCMG method, and the average pore diameter of porous silica of C4TAB with carbon atoms of 4 was 0.92 nm in GCMG method. Thus, it is found that porous silica containing super micro pores of which average pore diameter of 0.7 nm or more to 1.5 nm or less could be formed by using a surfactant with carbon atoms of less than 8. Formation of porous silica, of which pore volume was larger and 0.25 cm$^3$/g or larger, was also found.

Additionally, though the above meso-porous silica was synthesized by adding water of 2 to 4 eq, it was confirmed that the hydrolyzing process was preferably carried out by even using water of 8 eq. Thus, to improve the moldability, it is required that solvent is not present (solvent-free), that is, water should not be contained as the solvent. Water as the solvent refers to water (solvent) required for dissolving or dispersing, for example, alkoxy silane, a cationic surfactant or the like, and has an amount of several tens of equivalents (for example, 50 times the equivalent or more) of these materials. In contrast, the solvent-free of the present invention means that the added amount of water relative to alkoxy silane is set from 2 equivalents (eq), the minimum level required for the reaction, to about ten times as much, that is, in a range of 2 equivalents or more to 20 equivalents or less. More preferably, it is set from 2 equivalents or more to 10 equivalents or less. By the conditions, a mixture with high concentration between silicate ions and a surfactant can be formed with the system and the moldability and the stability of surfactant micelle can be ensured.

(Example B) Pore Diameter Control by Adding Organic Silane

Tetraethoxy silane (TEOS) (8 g) (0.038 mol; 1 eq) as a silica source and triethoxy vinyl silane (TEVS) (8 g×5%) (0.038 mol×5%) were added to a polypropylene container and mixed, and then, a surfactant of 0.2 to 1.2 equivalents was added, and stirred. Water of 2 to 4 equivalents adjusted to pH of 0 to 2 by using hydrochloric acid was added to this mixture and stirred at room temperature. After stirring for about 1 hour, TEOS was hydrolyzed and a virtually uniform solution was obtained. This solution (precursor solution) was kept at room temperature or 60° C., and continuously stirred or still stood. Gelation was completed from 12 hours to several days, and a visually colorless transparent gel was obtained from the entire solution. This gel was dried at 60° C., and baked at 600° C. for 3 hours to remove the surfactant. As the surfactant, three kinds of cationic surfactants such as octyltrimethyl ammonium bromide (C8TAB), hexyltrimethyl ammonium bromide (C6TAB) and butyltrimethyl ammonium chloride (C4AC) were used to form porous silicas, respectively.

The pores of the porous silica obtained were analyzed. That is, the specific surface area (SSA), pore volume (TPV), the average pore diameter (D) and the pore wall thickness (Dwall) were measured. The specific surface area (SSA) was measured by BET method. The average pore diameter was measured by GCMG method. The pore wall thickness, that is, the thickness of a wall forming a tube, can be measured by the results of an X-ray diffraction method or the like.

On porous silica (C8V) of C8TAB, the BET specific surface area was 519 m$^2$/g, and the pore volume was 0.25 cm$^3$/g. The average pore diameter was 0.99 nm. The pore wall thickness was 2.37 nm.

On porous silica (C6V) of C6TAB, the BET specific surface area was 582 m$^2$/g, and the pore volume was 0.25 cm$^3$/g. The average pore diameter was 0.82 nm. The pore wall thickness was 2.00 nm.

On porous silica (C4V) of C4TAB, the BET specific surface area was 355 m$^2$/g, and the pore volume was 0.16 cm$^3$/g. The average pore diameter was 0.77 nm. The pore wall thickness was 1.98 nm.

On the other hand, in the above embodiment A, when C8TAB was used, since the average pore diameter was 1.28 nm, the reducing effect in the average pore diameter from 1.28 nm to 0.99 nm was confirmed by adding an organic silane compound. The difference in the pore diameters was 0.29 nm.

Compared with the above embodiment A, when C6TAB was used, the reducing effect in the average pore diameter from 1.12 nm to 0.82 nm was confirmed by adding an organic silane compound. The difference in the pore diameters was 0.30 nm.

When C4TC was used, the reducing effect in the average pore diameter from 0.92 to 0.77 nm was confirmed by adding an organic silane compound. The difference in the pore diameters was 0.15 nm.

Thus, it was found that the pore diameter of the porous silica can be finely adjusted by adding an organic silane compound. Particularly, it was found that even if a surfactant with 8 carbon atoms was used, the formation of porous silica containing super micro pores with an average pore diameter from 0.7 nm or more to 1.5 nm or less can be formed. Moreover, assumed from the above reducing effect, even if a surfactant having carbon atoms of 10 or 12 is used, porous silica containing super micro pores with an average pore diameter from 0.7 nm or more to 1.5 nm or less can be formed by adding an organic silane compound. By a surfactant with a smaller number of carbon atoms, by increasing or reducing the added amount of a surfactant and organic silane, or by reducing a reaction temperature, the average pore diameter can be further reduced to about 0.5 nm.

The number of carbon atoms of the surfactant corresponding to the average pore diameter is selected by calculating the average pore diameter required according to adsorbate (for example, molecular diameter, or the like). A pore diameter can be finely adjusted (for example, adjustment scale of 0.1 nm of the pore diameter) by formation of porous silica by adding an organic silane compound. For example, the pore diameter can be finely control in the sub-nanometer order, that is, in the unit of m×10$^{-10}$.

(Example C) Synthesis of Porous Silica Nano Particles

TEOS (8 g) (0.038 mol; 1 eq) as a silica source was added to a polypropylene container and then, a surfactant (0.2 to 1.2 equivalents) was added thereto, polyethylene glycol (PEG) of which average molecular weight was 1000 (7.5 g) was further added thereto and stirred. After adding water of which pH value was adjusted to around 0 to 2 by hydrochloric acid equivalent to from 2 to 4, it was stirred at room temperature. After stirring for about 1 hour, TEOS was hydrolyzed to obtain a virtually uniform solution in which the surfactant and polyethylene glycol were dissolved. This solution (precursor solution) was kept at room temperature or 60° C., and stirred or still stood. Gelation was completed from 12 hours to several days, and a visually colorless transparent gel was obtained from the entire solution. This gel was dried at 60° C., and baked at 600° C. for 3 hours to remove the surfactant and polyethylene glycol.

The cationic surfactant may include octadecyltrimethyl ammonium chloride (C18TAC), hexadecyltrimethyl ammonium chloride (C16TAC), tetradecyltrimethyl ammonium bromide (C14TAB), dodecyltrimethyl ammonium bromide (C12TAB), decyltrimethyl ammonium bromide (C10TAB), octyltrimethyl ammonium bromide (C8TAB), hexyltrimethyl ammonium bromide (C6TAB) and butyltrimethyl ammonium chloride (C4TAC).

In the process including only gelation and baking as described above, monolithic porous silica consisting of an aggregate of nano particles was obtained by using a surfactant with carbon atoms of 16 or more while an amorphous porous silica of which distribution of pore diameters varied was obtained by using a surfactant having carbon atoms of 16 or less or made of a bromide salt.

Among the above precursor solutions, the precursor solution formed by C6TAB was dropped into a basic aqueous solution. 28% aqueous ammonia was used as the basic aqueous solution. The pH was around 13. The precursor granular solution dropped was formed into a gel and deposited in the ammonia solution. The resulting gel was dried at 60° C., and baked at 600° C. for 3 hours to remove the surfactant and polyethylene glycol. The porous silica was obtained as a white bead. The bead corresponds to the dropped shape of the precursor solution.

The basic aqueous solution may include aqueous solutions of amines or the like as well as the above aqueous ammonia. These bases are easily removed in the drying and baking processes, and are preferably used as basic aqueous solutions. Since dissolution of silica starts at a high pH region of pH 14 or more, when a basic aqueous solution of which pH is in high range was used, preferably, the silica is quickly removed from the solution after the reaction (after the gelation, the polymerization). Since the dissolving rate of silica becomes higher when ions of alkali metal or alkali-earth metal coexist in the reaction system, preferably, the above basic aqueous solution with ammonia or amines is used rather than an aqueous solution of sodium hydroxide etc.

When the pore diameter of porous silica synthesized by C16TAC was measured, two types of pore diameters were observed in the corresponding porous silica. That is, structures of the porous silica containing two kinds of fine pores, i.e. meso-pores derived from the surfactant of about 2 nm and meso-pores corresponding to particle gaps of about 20 to 50 nm, were observed.

In the porous silica synthesized by C6TAB, two kinds of pores, i.e. micro-pores of about 1 nm derived from a surfactant and meso-pores corresponding to particle gaps of about 5 to 10 nm were observed.

In the process including only gelation and baking as described above, monolithic porous silica consisting of an aggregate of nano particles was obtained by using a surfactant with carbon atoms of 16 or more while an amorphous porous silica of which distribution of pore diameters varied was obtained by using a surfactant having carbon atoms of 16 or less. In contrast, when the precursor solution is contacted with a basic aqueous solution, nano particles can be obtained even if the surfactant with carbon atoms of less than 16 is used.

The following is the explanation about the above phenomena. Silicate ions are neutralized or charged positively in a precursor solution of pH 0 to 2. Therefore, the silicate ions are interacted with polyethylene glycol by hydrogen bonds, and electrostatically interacted with a surfactant through counter anions. When a surfactant contains a short carbon chain, that is, a small number of carbon atoms, since its micelle forming capability is low; silica polymerization cannot sufficiently aggregate the surfactant and sufficiently separate polyethylene glycol from the system. Therefore, only amorphous silica can be obtained. In contrast, when the pH is drastically raised by dropping into the basic aqueous solution, since silicate ions are negatively charged, the cationic surfactant is strongly electrostatically interacted without interposing counter anions. The hydrogen bonds to polyethylene glycol are disappeared and electrostatic repulsion induces a phase change. It is considered that these two phenomena induce the micelle formation of the surfactant and the phase separation of polyethylene glycol and that porous silica can be formed to nano particles with pores corresponding to the chain length of the surfactant.

<2> Synthesis Method of Minute Particles

Minute particles (particles, nano particles, sub-nano particles) are synthesized by the porous silica synthesized in the above <1> by introducing a material such as metal etc. in the pores (micro pores, micro pores).

The porous silica is contacted with an aqueous solution containing a metal compound and infiltrates it into the pores of the porous silica. Then, after drying the porous silica, the metal is introduced into the pores of the porous silica by baking the resulting porous silica.

Aqueous solution containing a metal compound is not limited to the solution of which metal or the metal compound is deposited or baked. For example, the aqueous solution may include a compound containing a particle material as the component element such as an aqueous solution of tungsten peroxide.

The above tungsten peroxide aqueous solution may contain tungsten oxide ($WO_3$) in the pores of the porous silica. A copper salt such as copper acetate and copper nitrate may contain copper oxide in the pores of the porous silica. An iron salt such as iron chloride and iron nitrate may contain iron oxide in the pores of the porous silica. Manganese salt such as manganese nitrate may contain manganese oxide in the pores of the porous silica. A salt such as titanyl sulfate may contain titanium oxide in the pores of the porous silica.

Any metal salts may be applied, not particularly limited, when the corresponding compound is dissolved in a desired solvent and formed into a solution. The easy oxidization by baking treatment is preferable to obtain an oxide, and then, a salt such as a nitrate and an acetic acid salt, which is easily thermally decomposed, is preferably used. The solvent used may be water or an organic solvent, and a solvent of which pH is controlled by nitric acid, hydrochloric acid, or ammonia or the like so as to control the solubility of the metal salt may be used.

Since the porous silica has adsorption ability, a solution or a gas can be easily introduced into the pores of the porous silica by contacting with a solution or a gas. Moreover, a particle material (metal, metal compound, or the like) contained can be easily miniaturized by porous silica containing micro pores.

Thus, according to the synthesizing method of minute particles of this embodiment, a particle containing porous silica is easily formed by simple treatment. As shown in the above <1>, since porous silica with micro pore diameters of from 0.5 or more to 1.5 nm or less can be synthesized, the particle size (particle diameter) of particles contained can be easily miniaturized by the porous silica as a template. For example, the particle size (particle diameter) can be 1.5 nm or less, more preferably, to 1 nm or less (sub-nano order). Of course, according to the above synthesizing method <1>, particles with a size of a single-nano meter order (10 nm or less, more preferably, 5 nm or less) may be easily adjusted and prepared by a surfactant with a greater number of carbon atoms. Thus, a particle containing porous silica (functional composite) exhibiting peculiar properties which is not observed in the bulk state can be formed by reducing the size of particles contained.

In the above <1>, the distribution of the pore diameters can be reduced, that is, deviations in the pore diameter can be reduced and minute particles with a narrow particle-size distribution (sub-nano particles) can be synthesized. That is, the synthesis of quantum dots of which deviations in physical and chemical properties such as band gaps are less can be synthesized.

Moreover, a particle material (element forming particle or a compound comprising the element as a component element) can be easily introduced into the pores by using the above solution. In this solution process (solution phase process), any materials regardless of kinds of solutions (precursors), salts, complexes or the like may be introduced. For example, for synthesizing metal or a metal compound in the pores, a salt, a metal complex or the like with the metal ions can be used.

The particle material may be introduced as a gas. For example, by contacting with material gas capable of synthesizing the particle material, minute particles may be formed in the pores by vapor phase epitaxy (chemical reaction in vapor phase). A gas of which particle material is evaporated (vaporization) may be used.

Particularly, since the porous silica has adsorbing property, the particle material can be easily absorbed into the pores and minute particles with high uniformity can be formed.

Porous silica (solid) and a solid raw material are mixed in a mortar or the like, and by pressing with a pestle or the like, the solid particle material may be introduced into the pores.

The ratio of the minute particles in the porous silica can be controlled by the pore volume, the concentration of the solution (precursor) used in the solution process and the number of immersions. In the gas process, it can be controlled by the flow rate of the material gas or the like.

The porous silica itself is thermally and chemically stable. For example, the minute particles in the pores can be oxidized by heat treatment (baking) under an oxidizing atmosphere, or can be treated desirably such as carbonization by chemical treatment. The oxidized minute particles may be reduced by heat treatment under reduction atmosphere such as hydrogen atmosphere. The reduction process may be carried out by light irradiation. A sulfide can be obtained by heat treatment under a hydrogen sulfide atmosphere.

A targeted compound can be obtained by reacting a particle containing the pores with a gaseous compound generated by chemical reaction in the silica pores. This method is particularly effective to obtain sub-nano particles of cadmium telluride. After generating particles of cadmium chloride in the pores, cadmium telluride can be obtained by reacting the resulting particles with hydrogen telluride gas or the like. Though cadmium telluride has drawn attentions because of its high conversion efficiency and light-emission efficiency in application on a solar cell or a fluorescent material, its toxicity makes its application apprehensive.

Since cadmium telluride is contained in the silica pores in the obtained product by the synthesis method of the present invention, the risk of its toxicity and the discharging risk of the sub-nano particles into the environment can be reduced.

Thus, the material of minute particles may include metal, a metal compound, various kinds of various materials such as carbon and carbon compounds (for example, SiC, or the like). The metal compound (including semiconductors, ceramic materials, etc.) may include metal oxides, metal nitrides, metal sulfides, etc., and the metal oxide may include tungsten oxide, titanium oxide, or the like, the metal nitride may include tungsten nitride (WN), or the like, and the metal sulfide may include cadmium sulfide (CdS), or the like.

The minute particles as a functional material may be applied in porous silica (as a composite material between minute particles and silica). Particularly, as described above, since the porous silica is thermally and chemically stable and superior in light-transmitting property, the porous silica may be directly applied as an effective support in application on a photo-catalyst, an optical element, or the like.

By decomposing the template of the porous silica, only the minute particles may be removed and secured (supported) on another material (support) as a functional material. For example, the minute particles can be removed from the porous silica by dissolving the silica skeleton with a sodium hydroxide aqueous solution, hydrofluoric acid or the like.

Moreover, the quantum dots of particle containing porous silica obtain various functions.

For example, light absorption and light emission of a specific wavelength generated by adjusting the band gap derived from the quantum size effect can be used as a light-emitting material. The light-emission wavelength is correlated with the band gap and can be controlled by controlling the particle size. The resulting particles can have an upconversion fluorescent characteristic by selecting the compound contained (for example, carbon, cadmium sulfide, cadmium telluride, or the like). The frequency conversion between absorption light and emission light can be obtained and the resulting particles can be utilized as an element (optical element) of frequency-converting, for example, near infrared light to visible light, or visible light to ultraviolet light, or the like.

The resulting particles may be utilized as a photo-catalyst material. When light (ultraviolet ray) is applied onto titanium dioxide, electrons in a valence band are excited into a conduction band and electrons ($e^-$) and holes ($h^+$) are generated. These holes obtain strong oxidizability and electrons are removed from peripheral molecules to be oxidized. When water molecules are oxidized, OH radicals are generated. Electrons excited into the conduction band give electrons by electron transfer to peripheral molecules and is reduced. When oxygen is reduced, super oxide radical anions ($O_2^-$.) are generated. Since these radicals have high reactivity, organic substances (harmful substances) in the air or in water are decomposed into carbon dioxide. Thus, the harmful substances can be eliminated. This oxidation-reduction reaction proceeds only when difference between the level of the valence band and conduction band of a photo-catalyst and the oxidation-reduction level of the reaction substrate directs toward energetic stability to each direction of electron transfers. That is, the conduction band level of the photo-catalyst should be negative from the level of the target reduction reaction, and the level of the valence band should be positive from the level of the target oxidation reaction. Therefore, the effective application of the compound as a photo-catalyst is limited because of these restrictions. For example, since the valence band of tungsten oxide is located at a lower level compared with those of other semiconductors, it shows strong oxidizability. However, since the conduction band is located at a lower level compared with that of titanium oxide or the like, its reducing ability is generally considered low. In fact, since the conduction band level of tungsten oxide is lower than the reduction level of oxygen, reduction reaction of oxygen cannot be happened. Consequently, when tungsten oxide is utilized for a decomposing reaction of an organic substance in water, although the organic substance can be decomposed by direct oxidation by holes and the generation of OH radicals, a state of excessive electrons is soon occurred because of incapability of reaction by electrons in the conduction band. Since this electron excessive state accelerates the recombination of exciton, the photo-catalyst efficiency becomes greatly low. Thus, it is necessary to effectively utilize electrons in the conduction band to use tungsten oxide as a photo-catalyst. Even if the level of the valence band and the conduction band satisfy enough level of target reaction, excessive energy is required to exceed the activation energy barrier. This excessive energy can be supplied by a differential energy between the target reaction level and the valence band level as well as the conductive band level; therefore, when the level difference is large, the efficiency of the target reaction can be improved. The reactivity and reaction efficiency of the photo-catalyst greatly relate to the levels of the valence band and conduction band. Therefore, if the levels of the valence band and conduction band can be controlled, the reactivity and reaction efficiency can be desirably controlled by the same substance. A method for controlling the particle size uses a quantum size effect capable of controlling the levels of the valence band and the conduction band, and forms a very effective means for this purpose. The particle-diameter region showing the quantum size effect is generally a region where the diameter is located in a single nano-meter range, and the effect is shown more remarkably in a sub-nano-meter range. Therefore, to control and show greater quantum size effect, the particle-diameter should be essentially controlled in the sub-nano-meter range. The controllability of the conventional nano-particle synthesizing methods is inferior within the sub-nano-meter range, and the group of applicable compounds is limited. Since a normal compound synthesizing process can be introduced in the method of the present invention, it can be applicable to all the group of compounds that can be chemically synthesized so far. Since each cylinder-shaped pore is used as a template and particles of which size is larger than the pore diameter are not generated as sub-products, a product with a very sharp particle-size distribution can be obtained. Since three-dimensional pore structure such as that of zeolite is not generated, a particle cannot be combined with one another and a large particle with a low quantum size effect cannot be formed, and, the resulting product can be used in a stable manner. Thus, the resulting product can be utilized as an effective photo-catalyst by the quantum size effect.

The resulting product may be used as a pigment material for a pigment sensitization-type solar cell, or as quantum dots for a quantum dot-type solar cell.

Specifically, the resulting product may be used as semiconductor particles receiving electrons from a sensitizer or as the sensitizer itself. Although the configuration of a pigment sensitization-type solar cell is not limited, for example, a configuration including a transparent electrode provided with an aggregate of nano particles of titanium oxide, another electrode and an electrolytic solution sealed between these electrodes, is proposed. Although titanium oxide only absorbs ultraviolet rays, it is shown the sensitivity toward visible light by adsorbing a sensitizer onto the surface of titanium oxide (pigment sensitization). When light is applied onto the solar cell, the pigment adsorbed onto titanium oxide is brought to an excited state to discharge electrons. These electrodes reach the transparent electrode through titanium oxide, and flow externally. In contrast, the sensitizer of a cation by discharging electrons receives electrons supplied from the other electrode via anions in the electrolytic solution to be reduced, and return to its original form. A difference between the Fermi level of both the semiconductor particles located on the negative electrode and the metal located on the counter electrode determines an electromotive force (open voltage) of the solar cell. Therefore, the electromotive force of the solar cell can be controlled by controlling the conduction band level of the semiconductor particles by the quantum size effect. Gold sub-nano particles and carbon sub-nano particles may be used as a sensitizer functioning as a sensitizer that is less susceptible to degradation compared with an organic pigment.

Thus, the particle containing porous silica of this embodiment may be used as a photo-catalyst material and a pigment material for a pigment sensitization-type solar cell.

The effect is described below. As described above, sub-nano particles with high size controllability and a narrow particle-size distribution can be produced by this embodiment.

Since the band gap energy can be controlled by controlling the particle diameter when a material of particles contained is metal, a semiconductor, or the like, the light-emission spectrum and catalyst activity can be precisely controlled. It can be utilized as a light-emitting element, a bioimaging material and a catalyst with high durability.

It is possible to functionally control by increasing the band gap by the quantum size effect when a material of particles contained is a semiconductor having a photo-catalytic function or the like. Examples described later indicate that a single electron reduction of oxygen can be carried out by the sub-nano particles of tungsten oxide. This phenomenon never occurs in a bulk tungsten oxide. These products are expected as a catalyst with high performances, particularly, as an effective photo-catalyst for producing hydrogen by the decomposition of water and a carbon dioxide securing reaction. Sub-nano particles of semiconductor particles shows the photochromism of tungsten oxide described later and the thermochromism of copper oxide, and those can be applied to a sensor or the like.

When the particle material contained is carbon or the like, as described in examples later, light emission is observed under irradiation of ultraviolet rays. These can be also applied to a light-emitting element, a bioimaging material and the like.

Thus, the effect of miniaturization of the various particle materials (particularly, when formed into sub-nano particles) is that its characteristics can be controlled by controlling its particle size, and the catalyst activity, the reaction selectivity, the light-emission spectrum distribution or the like can be consequently controlled. Particularly, in this embodiment, by using porous silica containing a pore diameter of 0.5 to 1.5 nm as a template, synthesizing process with a very high size selective property can be carried out and sub-nano particles with a narrow grain-size distribution can be produced.

Particles generated are contained in porous silica itself with high dispersibility. Since the porous silica functions as an excellent adsorbing material and shows superior light transmitting property, it can be directly used as an effective support and composite member in a photo-catalyst, an optical element, or the like. Porous silica can be applied to a more effective catalyst and a nano-fluorescent material by being formed into nano particles.

EXAMPLES

This embodiment will be described in more detail based on examples.

The present invention is not limited by these examples.

Example 1

<1-1> Synthesis of Porous Silica

Tetraethoxy silane (TEOS) (8 g) (0.038 mol; 1 eq) as a silica source was added to a polypropylene container and a surfactant in a range from 0.0075 to 0.038 mol was also added to form a mixed solution. This mixed solution was stirred and the surfactant was dispersed in TEOS.

Hexyltrimethyl ammonium bromide (C6TAB) or butyltrimethyl ammonium chloride (C4TAC) was used as the surfactant. A mixed solution used was added 5 mol % of trimethoxyvinyl silane (TEVS) to TEOS in addition to the surfactant.

Water (2.74 g) (0.152 mol; 4 eq) of which pH was adjusted to pH 2 by hydrochloric acid was added to each of the above four mixed solutions, and this was kept at room temperature, and continuously stirred. Gelation was completed in all the mixed solutions from 12 hours to several days, and a visually colorless transparent gel was obtained from the entire solution. This gel was dried at 60° C., and baked (heat treatment) at 600° C. for 3 hours and four kinds of porous silicas (Samples) were obtained by removing the surfactant.

Regarding the resulting porous silicas, the pore structure, the specific surface area, the pore volume and the average pore diameter of the sample were examined by a nitrogen adsorbing device (Tristar 3000, manufactured by Micromeritics Co., Ltd.). The sample was measured by degassing at 160° C. for 3 hours immediately before the test by VacPrep061 (manufactured by Micromeritics Co., Ltd.). The pore-size distribution of the sample was analyzed by GCMG method with nitrogen adsorbing device (BELSORP-max, manufactured by BEL Japan, Inc.).

Table 1 shows the results of analysis on the pores of the resulting porous silica. On each sample (Sample), the specific surface area (SSA, [$m^2/g$]), the pore volume (TPV, [$cm^3/g$]) and the average pore diameter (Dpore [nm], diameter) were measured. The specific surface area (SSA) was measured by BET method. The pore volume (TPV) was measured as a total pore volume. The average pore diameter (D) was measured by GCMG method.

TABLE 1

| Samples | SSA $m^2/g$ | TPV $cm^3/g$ | $D_{pore}$ nm |
|---|---|---|---|
| C6SMPS | 632 | 0.32 | 1.12 |
| C4SMPS | 586 | 0.29 | 0.92 |
| C6VSMPS | 582 | 0.25 | 0.82 |
| C4VSMPS | 355 | 0.16 | 0.77 |

The BET specific surface area of porous silica (C6SMPS) of C6TAB was 632 $m^2/g$, and the pore volume was 0.32 $cm^3/g$. The average pore diameter was 1.12 nm.

The BET specific surface area of porous silica (C4SMPS) of C6TAC was 586 $m^2/g$, and the pore volume was 0.29 $cm^3/g$. The average pore diameter was 0.92 nm.

The BET specific surface area of porous silica (C6VSMPS) of C6TAB and TEVS was 582 $m^2/g$, and the pore volume was 0.25 $cm^3/g$. The average pore diameter was 0.82 nm.

The BET specific surface area of porous silica (C4VSMPS) of C4TAC and TEVS was 355 $m^2/g$, and the pore volume was 0.16 $cm^3/g$. The average pore diameter was 0.77 nm.

Porous silica with controllability, specifically, with superior controllability of pore diameter and reactivity was synthesized by sol-gel reaction in solvent-free system. Particularly, porous silica with pores of which average diameter is small, 0.5 nm or more to 1.5 nm or less was synthesized by a surfactant with carbon atoms of less than 8. The porous silica with the pore diameter is referred to "super microporous silica (SMPS)".

By adding an organic silane compound such as TEVS, the average pore diameter of porous silica of C6TAB reduced from 1.12 nm to 0.82 nm, and the average pore diameter of porous silica of C4TAC was reduced from 0.92 nm to 0.77 nm. It was found that the pore diameter was further miniaturized by adding the organic silane compound.

<1-2> Synthesis of Minute Particles

Minute particles of tungsten oxide ($WO_3$) were synthesized by using the above porous silica as a template. After grinding 2 g of each of the above 4 kinds of porous silicas in a mortar into powder, adsorbed materials such as water were removed by putting into a two-neck flask to decompress by a vacuum pump for several hours to overnight (decompression drying process). Then, the decompression was temporarily stopped, and 0.2M (mol) of a tungsten peroxide aqueous solution was added to each porous silica. At this time, inside the flask was maintained at negative pressure. The aqueous solution was uniformly infiltrated into the pores by stirring and vibrating the aqueous solution and the power (impregnation process). The added amount of the tungsten peroxide aqueous solution at one time of the impregnation process was adjusted to the same as the pore volume (TPV, [$cm^3/g$])×2 g or less. Then, the decompression drying process was carried out again. After repeating these impregnation process and decompression drying process several times, the dried sample was baked in the air at 400 to 600° C. for about 3 hours and porous silica containing minute particles of tungsten oxide contained in the pores was obtained.

In this embodiment, the precursor aqueous solution was introduced by infiltration under decompression to maintain the weight of the particles at a constant value and to minimize particles which are generated outside the pores and intervene the analysis. When a slight amount of particles are generated out of the pores, for example, when the product is used for catalyst or the like, the precursor solution may be infiltrated under a normal pressure or by an immersing process into the aqueous solution. By removing the excessive precursor aqueous solution attached to the outside particles by water washing or the like, particles can be generated only in silica pores same as in the infiltration under decompression.

i) Observations were conducted on the resulting porous silica containing tungsten oxide by a transmission-type electron microscope (TEM). Specifically, the shape and particle size of the sample were measured by FE-TEM (TECNAI F20: FEI). The observation sample was prepared by dispersing a ground sample over a copper mesh attaching a collodion film.

FIG. 1 shows a transmission-type electron microscopic image (TEM image) of the resulting porous silica containing tungsten oxide and a distribution (graph) of the particle sizes of the tungsten oxide. The horizontal axis of the graph indicates the particle diameter (Diameter, [nm]) and the vertical axis indicates the number of pieces (Counts, [pieces]).

Figure 1B:
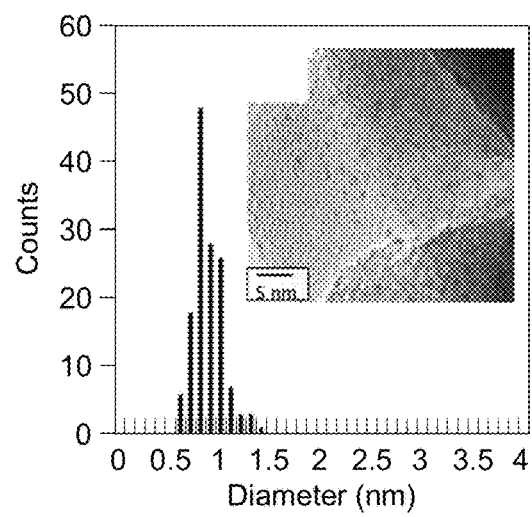
Figure 1C:
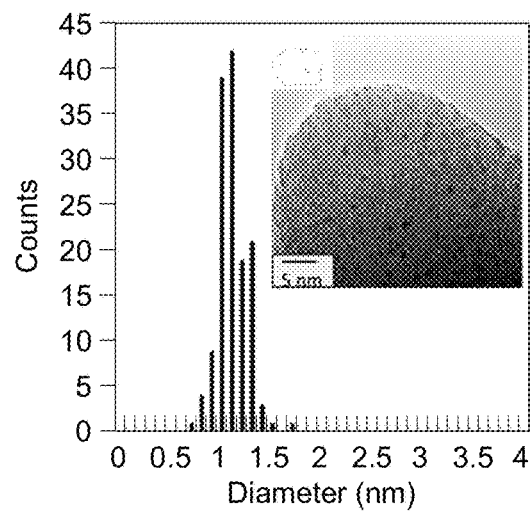

FIG. 1(a) shows an image of C4VSMPS (C4VW) containing tungsten oxide. FIG. 1(b) shows an image of C4SMPS (C4W) containing tungsten oxide. FIG. 1(c) shows an image of C6SMPS (C6W) containing tungsten oxide. It is shown that the particle diameter of the tungsten oxide is 1 nm or less in all the images. No deviations are observed on inner portions, and the particles are virtual uniform with high concentration, that is, highly dispersed.

As shown in FIG. 1(a), on C4VSMPS (C4VW) containing the tungsten oxide, the ratio of the particle diameters of about 0.8 nm was high and an average particle diameter was 0.77 nm. As shown in FIG. 1(b), on C4SMPS (C4W) containing the tungsten oxide, the ratio of the particle diameters of about 0.8 nm was high and an average particle diameter was 0.89 nm. As shown in FIG. 1(c), on C6SMPS (C6W) containing the tungsten oxide, the ratio of the particle diameters of about 0.9 nm was high and an average particle diameter was 1.11 nm.

Thus, a metal compound such as tungsten oxide could be contained in the pores of the porous silica. Particularly, the metal compound such as tungsten oxide could be contained in the porous silica containing micro pores of which diameter is 0.5 nm or more to 1.5 nm or less. It was found that the particle diameter of tungsten oxide became smaller when it was contained in porous silica containing a smaller pore diameter and minute particles corresponding to the size of the pore diameter of the porous silica could be formed. It was also found that superior minute particles with a narrow particle diameter distribution located, for example, within about ±0.3 nm from the average particle diameter could be formed.

ii) On the resulting porous silicas containing tungsten oxide, ultraviolet-visible ray absorption spectra were measured by an ultraviolet-visible ray absorption photometer (UV-Vis) V-550 (manufactured by JASCO Corporation) and the band gap energy of the minute particles of tungsten oxide was measured based upon a Tauc plot. The Tauc plot is a method for measuring the band gap of a semiconductor based upon the absorption end of an ultraviolet-visible ray absorption spectrum. In the light absorption occurred by optical transition between bands of a semiconductor, a relationship indicated by "$\alpha = k(E-Eg)^2/E (k=constant)$" is satisfied in the relationship between the absorbance and photon energy. Therefore, the photon energy E (Energy, hv[eV]) is set on the horizontal axis, with the product of the absorbance ($\alpha$) and the photon energy E (Energy, hv[eV]) raised to the n-th power (($\alpha$hv)$^n$) being set on the vertical axis, and a tangential line is drawn. The value of n is indicated by n=2 of the direct transition type, while it is indicated by n=½ of the indirect transition type. The intersection between this tangential line and the base line indicates the band gap energy (Eg).

Figure 2:
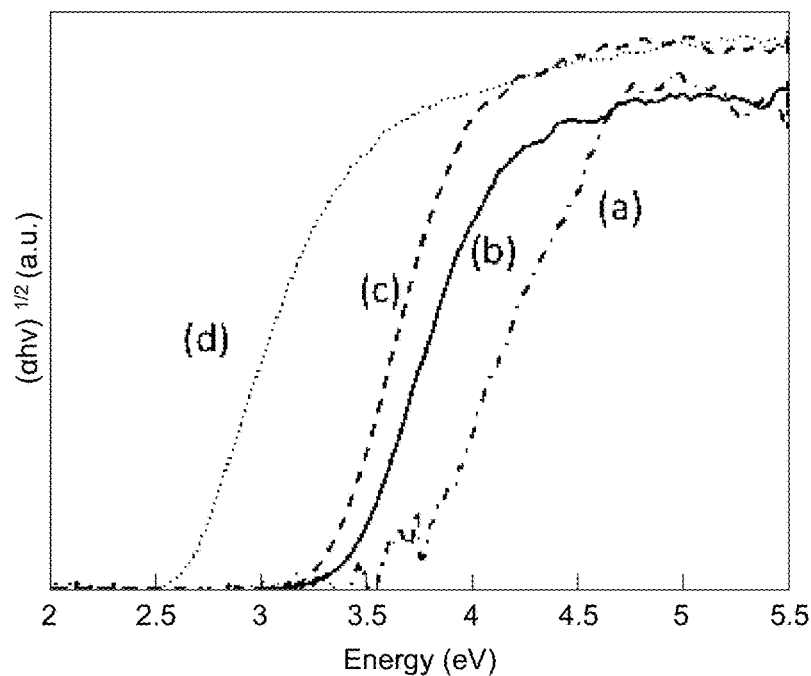
FIG. 2 shows Tauc plots of the porous silica containing tungsten oxide obtained in example 1.

FIG. 2 shows Tauc plot of the resulting porous silica containing tungsten oxide. A graph (a) shows the plots of C4VSMPS (C4VW) containing the tungsten oxide. A graph (b) shows the plots of C4SMPS (C4W) containing the tungsten oxide. A graph (c) shows the plots of C6SMPS (C6W) containing the tungsten oxide. A graph (d) shows plots of bulk tungsten oxide, that is, tungsten oxide is not formed into fine particles, in other words, a lump of tungsten oxide.

When the band gap energy (Eg) was calculated on the graphs (a) to (c), Eg of (a) C4VSMPS (C4VW) containing the tungsten oxide was 3.69 eV, Eg of (b) C4SMPS (C4W) containing the tungsten oxide was 3.43 eV, and Eg of (c) C6SMPS (C6W) containing the tungsten oxide was 3.32.

Table 2 shows the pore diameter of porous silica forming a template (Pore diameter of SMPS, [nm]), the particle size of the tungsten oxide contained therein (Particle size), the particle size calculated from the band gap energy (Eg) (Calculated particle size [nm]) and the above band gap energy (Eg, [eV]) of the resulting porous silicas containing the tungsten oxide. The particle size calculated from the band gap energy (Eg) was calculated by so-called Brus formula. The Brus formula is represented by "$Eg = Egb + h^2\pi^2/2R^2 \cdot (1/Me + 1/Mh) - 1.8\ e^2/\varepsilon R$", and Eg represents the above band gap energy [eV], Egb represents the bulk band gap energy –[eV], and h represents the Planck's constant ($4.136 \times 10^{-15}$ eV·s). R represents a particle radius, Me and Mh represent effective masses of electrons and holes, respectively, and $\varepsilon$ represents a dielectric constant.

TABLE 2

| Sample | Pore diameter of SMPS (nm) | Particle size (nm) | Calculated particle size (nm) | Eg (eV) |
|---|---|---|---|---|
| C6W | 1.12 | 1.11 | 0.97 | 3.32 |
| C4W | 0.92 | 0.89 | 0.87 | 3.43 |
| C4VW | 0.77 | 0.77 | 0.70 | 3.69 |

As indicated by Table 2, on C6SMPS (C6W) containing the tungsten oxide, particles with a diameter of 1.11 nm were observed in the porous silica with a pore diameter of 1.12 nm, and the Eg of the particles was 3.32 eV. The particle diameter calculated by the Eg was 0.97 nm.

On C4SMPS (C4W) containing the tungsten oxide, particles with a diameter of 0.89 nm were observed in the porous silica with a pore diameter of 0.92 nm, and the Eg of the particles was 3.43 eV. The particle diameter calculated from the Eg was 0.87 nm.

On C4VSMPS (C4VW) containing the tungsten oxide, particles with a diameter of 0.70 nm were observed in the porous silica with a pore diameter of 0.77 nm, and the Eg of the particles was 3.69 eV. The particle diameter calculated from the Eg was 0.70 nm.

Thus, the correlation of pore diameter and the particle diameter is excellent. Smaller the particle diameter becomes, greater the Eg becomes and the quantum size effect can be confirmed. Since the particle diameter calculated from the Eg also has an excellent correlation with the measured result (particle diameter) by TEM and the formation of minute particles (2 nm or less, more preferably, in a sub-nano order (1.0 nm or less)) is confirmed.

Figure 3:
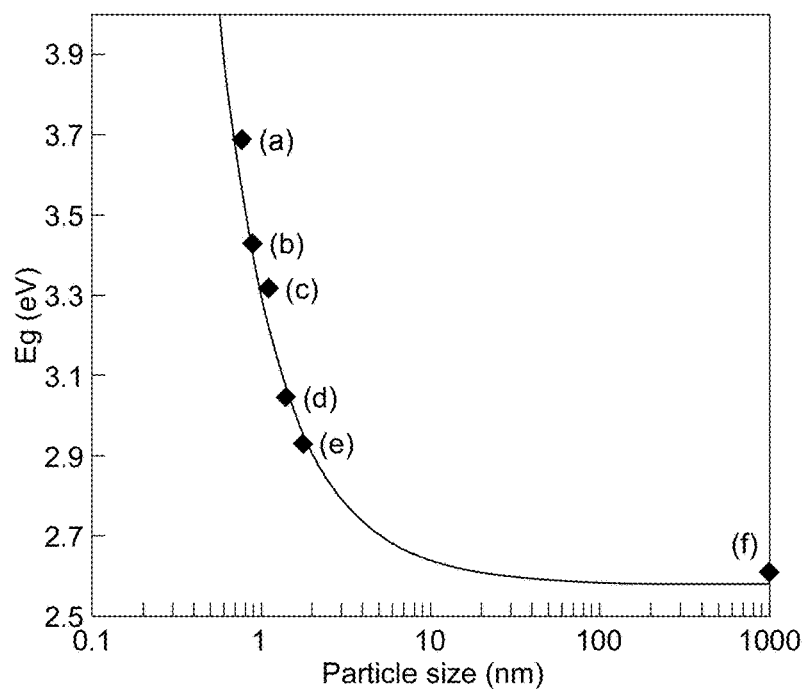
FIG. 3 shows a relation between the particle diameters of porous silica containing tungsten oxide obtained in example 1 and band-gap energy.

FIG. 3 shows a relation between the particle diameter (Particle size) of the resulting porous silica containing tungsten oxide and the band gap energy Eg. Point (a) shows a plot of C4VSMPS (C4VW) containing the tungsten oxide, point (b) shows a plot of C4CSMPS (C4W) containing the tungsten oxide, and point (c) shows a plot of C6SMPS (C6W) containing the tungsten oxide. On samples ((d) and (e)) containing tungsten oxide in porous silicas with a large pore diameter formed by a surfactant with carbon atoms of 8 or more, the relation between the particle diameter and the Eg is also shown. The particle diameter of sample (d) is 1.4 nm, and the particle diameter of sample (e) is 1.8 nm. Point (f) shows a plot of bulk tungsten oxide (a particle diameter of 1000 nm).

FIG. 3 also shows that the when particle diameter is located in a sub-nano range, the Eg abruptly is greater and the quantum size effect is remarkable.

iii) On each resulting porous silica containing the tungsten oxide, the single electron reducing capability of oxygen was evaluated. Each resulting sample was put under an ultraviolet ray irradiation, and evaluated by utilizing electron spin resonance (ESR) by spin trap method using an electron spin resonance E-500 (manufactured by Bulker Co., Ltd.). As the spin trapping agent, dimethylpyrroline-N-oxide (DMPO) was used.

By supplementing super oxide radical anions ($O_2^-$.) that are products of the single electron reducing reaction of oxygen with DMPO, the signal of the generated DMPO-OOH radicals was observed by ESR. Specifically, the following experiments were carried out.

C4SMPS (C4W) containing the tungsten oxide (40 mg) and bulk tungsten oxide (4 mg) obtained by baking tungsten acid at 600° C. for 3 hours were weighed, and added to an ethanol solution (5 ml) of 40 mM DMPO, respectively, and dispersed. The amounts of samples are different because the masses of tungsten oxide in the respective samples are adjusted to be the same amount.

The above dispersion solution was introduced into a flat cell of ESR, and irritated with ultraviolet-ray for 90 minutes by a commercial black light as a light source. The single electron reducing capability of oxygen was evaluated based on ESR spectra before and after the ultraviolet-ray (UV) irradiation. The intensity (signal intensity) of all the spectra was calibrated by utilizing tetramethylpyrrolidinoxy free radicals with a known concentration as a standard sample.

FIG. 4 shows ESR spectra. The horizontal axis indicates the intensity of a magnetic field (Magnetic Field, [G]), and the vertical axis indicates the signal intensity (Intensity). The signal intensity corresponds to the number of free radicals, that is, the generated $O_2^-$. amount.

Figure 4A:
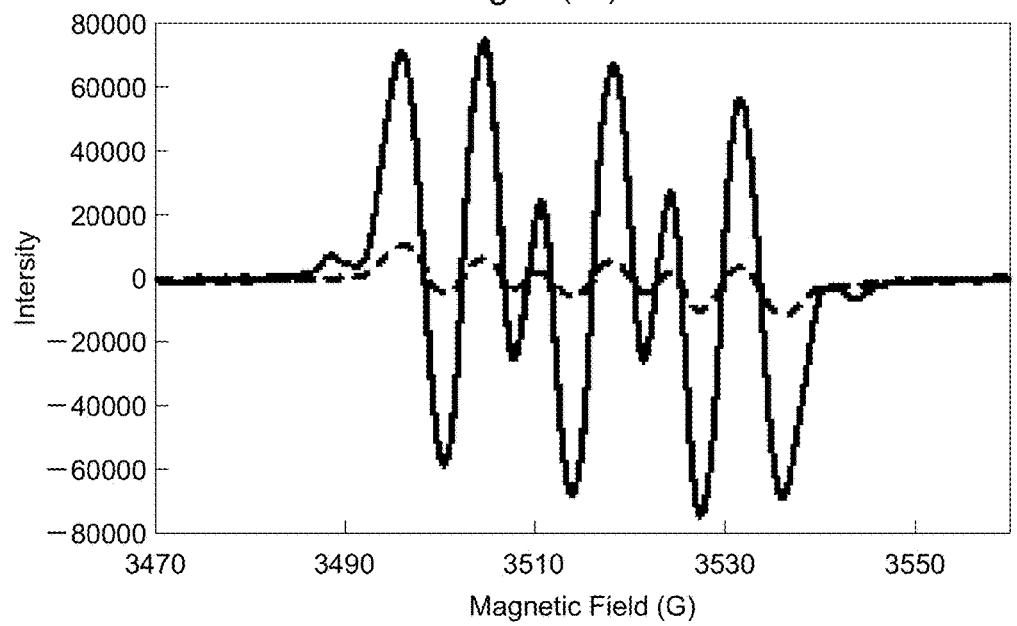
FIGS. 4A-4B show an ESR spectrum of the porous silica containing tungsten oxide obtained in example 1.
Figure 4B:
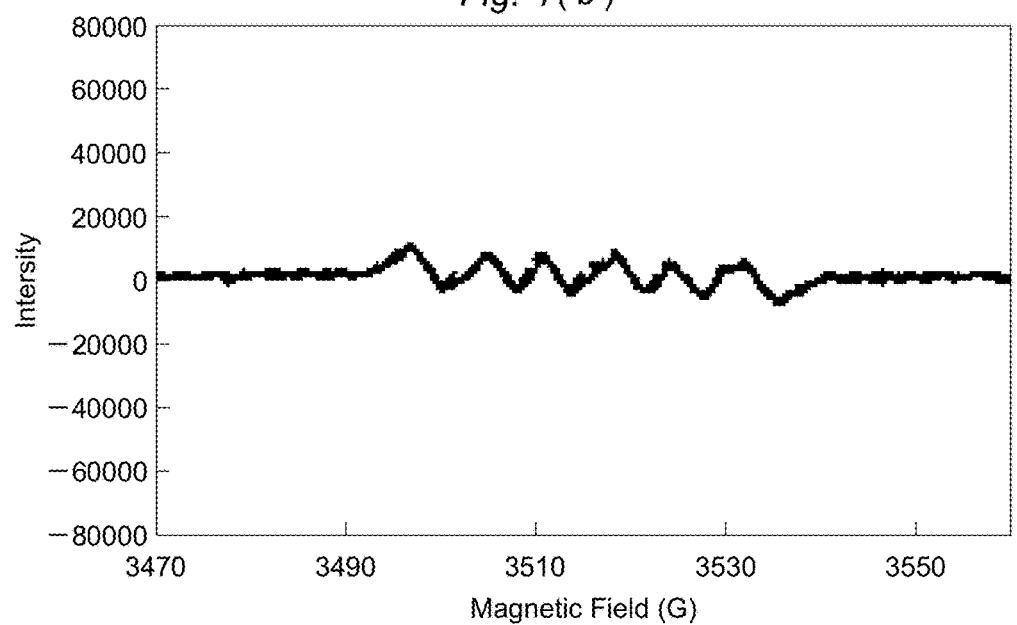

FIG. 4(a) is an ESR spectrum of C4SMPS (C4W) containing the tungsten oxide, and a broken line (dotted line) indicates an ESR spectrum before the UV-ray irradiation, and a solid line indicates an ESR spectrum after the UV-ray irradiation. As shown in the figures, an increase of the signal intensity due to the UV-ray irradiation was observed in the C4SMPS (C4W) containing the tungsten oxide. That is, the generation of DMPO-OOH radicals was observed. In contrast, any change in the signal intensity was hardly observed in the bulk tungsten oxide shown in FIG. 4(b) before and after the UV-ray irradiation.

The single electron reducing reaction of oxygen due to irradiation of the Ultraviolet-ray the C4SMPS (C4W) containing the tungsten oxide was observed. Consequently, a reaction pathway to quickly consume both generated electrons and holes is ensured. It makes the recombination of electrons and holes suppress, and the reaction efficiency remarkably improves. For example, in an environmental purification field, it is observed that odor components or the like is decomposed by super oxide radical anions ($O_2^-$.) with a very strong oxidizing function generated by irradiating with the ultraviolet-ray and photo-catalytic functions. In addition to the decomposition of odor components, other functions such as water quality purification, sick house gas decomposition, decomposition of toxic substances in exhaust gases, removal of soil contamination substances, decomposition of environmental hormones and dioxin, sterilization or the like can be obtained.

iv) Photochromic behaviors of the resulting tungsten oxide particles were observed. It is known that a thin film of tungsten oxide shows photochromism. It was observed that the tungsten oxide particles obtained in the present invention also show reversible photochromism by irradiating ultraviolet rays. The resulting tungsten oxide-silica composite material was put into a watch glass, and irradiated with an ultraviolet-ray of 365 nm. More remarkable color change was observed by dropping alcohol such as ethanol to the sample. These phenomena are reversible and can be visually observed. The improvement of the photochromic behaviors by dropping ethanol is obtained by its coloring mechanism. Reduced $W^{5+}$ ions are generated in tungsten oxide by photo-irradiation, and the d-d transition of $W^{5+}$ ions makes the color change into blue. In contrast, When alcohol with an α proton such as ethanol coexists,—electrons are excessively injected into holes during its decomposing process. It is therefore considered that the generation efficiency of $W^{5+}$ ions is more improved than usual and the photochromism is more remarkable. It can be applicable to a sensor, a display material or the like by utilizing these characteristics. A normal tungsten oxide thin film is known that a discoloring speed from blue to white is slow and heat treatment is required to accelerate. Meanwhile, time required for discoloration of the sub-nano particles of tungsten oxide obtained in the present invention is less than 10 minutes at room temperature. This high reversible characteristic is effective for the application to a sensor or the like.

Example 2

In this example, porous silica with first pores (micro pores) of porous silica elemental substance and second pores consisting of inter-particle gaps among the respective particles forming an aggregate of a plurality of porous silicas is synthesized by forming nano particled porous silica, and then, minute particles of tungsten oxide ($WO_3$) are synthesized by using the porous silica with these two kinds of pores as a template. Thus, nano particled porous silica can improve the substance diffusing efficiency of a solvent to be impregnated, and can effectively contain the minute particles therein. The silica as a catalyst can increase the diffusing efficiency and the catalyst interface of molecules and improve functions such as a catalyst activity. The functions as a light-emitting material can be improved because of its improvement of the diffusing property into the medium.

<2-1> Synthesis of Porous Silica

Tetraethoxy silane (TEOS) (8 g) (0.038 mol; 1 eq) as a silica source was put to a polypropylene container and hexyltrimethyl ammonium bromide (C6TAB) as the surfactant was added from 0.0075 to 0.038 mol. During stirring this mixed solution, the surfactant was dispersed in TEOS. Next, 0.0075 mol of polyethylene glycol (PEG) of which average molecular weight is 1000 was added and stirred therein.

Then, 2.74 g (0.152 mol; 4 eq) of water adjusted to pH 2 by hydrochloric acid was added to the solution, and maintained at room temperature. The TEOS was hydrolyzed by stirring for 1 hour and a virtually uniform solution was obtained. This solution was still stood at room temperature and matured from several hours to several days to form a precursor solution.

The above precursor solution was dropped into 28% aqueous ammonia by syringe. The precursor solution dropped was gelled instantaneously on moving into the aqueous ammonia with its spherical shape being maintained. The precipitated white spherical gel was collected, dried, and baked at 600° C. for 3 hours to remove the surfactant and polyethylene glycol. Thus, white porous silica with a spherical shape of which diameter is about 2 to 3 mm was obtained.

The average pore diameter of the resulting porous silica was measured by BJH method and two kinds of pore diameters were observed. The average pore diameter of a micro pore of the first pore was 1.1 nm, and as the average pore diameter of a meso pore of the second pore was 20 nm.

<2-2> Synthesis of Minute Particles

Minute particles of tungsten oxide ($WO_3$) were synthesized by using the above porous silica with two kinds of pores as a template. After grinding 2 g of each above porous silica in a mortar into powder, the resulting power was put into a two-neck flask and kept under decompression for several hours to overnight to remove adsorbed materials such as water (decompression drying process). Then, 0.2 M of a tungsten peroxide aqueous solution was added to each porous silica, and the powder in the aqueous solution was stirred and vibrated under decompression and the aqueous solution was uniformly infiltrated into the pores (impregnation process). The amount of the tungsten peroxide aqueous solution added at one time of the impregnation process was about the same as the first pore volume (micro pores) (TPV, [$cm^3/g$])×2 g or less. Then, the decompression drying was carried out again. After repeating these impregnation process and decompression drying process several times, the dried sample was baked in the air at 400° C. to 600° C. for about 3 hours and porous silica containing minute particles of tungsten oxide only in the first pores was obtained. The following is the reason why particles were generated only in the first pores. The stability of a condensed phase by pore filling becomes very high in the first pores compared with the second pores because of a great difference between the pore diameters. When the solution of which volume corresponds to the volume of the first pore is impregnated, infiltration into the first pores occurs preferentially. Thus, the second pores can be maintained as spaces for diffusing substances with quantum dots in the first pores.

Electron spectra (visible-ultraviolet ray absorption spectra) of the resulting porous silica containing tungsten oxide were found by ultraviolet-visible ray absorption photometer (UV-Vis) V-550 (manufactured by JASCO Corporation), and the band gap energy of the minute particles of tungsten oxide was found based upon Tauc plots.

Figure 5:
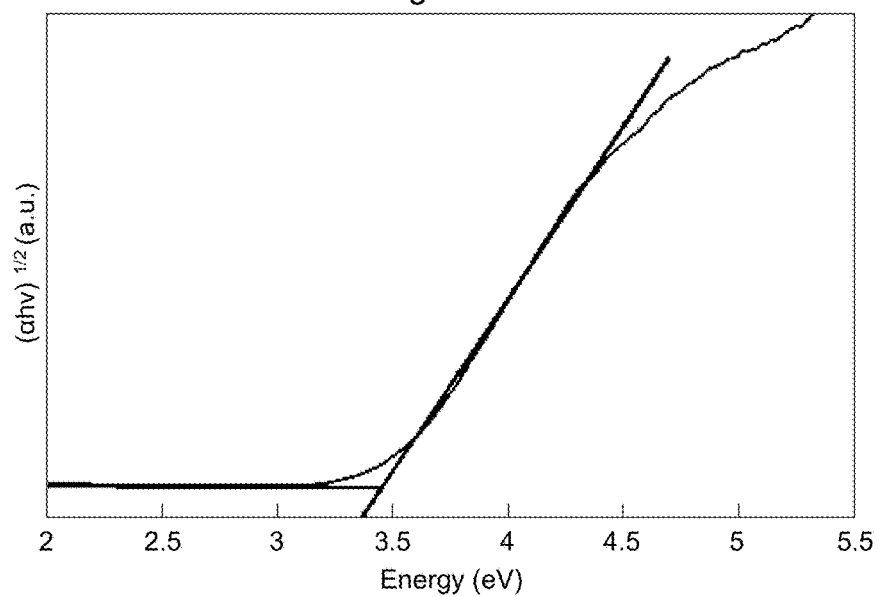
FIG. 5 shows Tauc plots of the porous silica containing tungsten oxide obtained in example 2.

FIG. 5 shows Tauc plots of the resulting porous silica containing tungsten oxide. The axis of abscissa indicates photon energy E (Energy, hv[eV]), and the vertical axis represents a root $((\alpha h v)^{1/2})$ of the product of the absorbance ($\alpha$) and the photon energy (hv[eV]). From the graph, it is found that the band gap energy (Eg) is about 3.3 eV. Since the Eg of the particles in C6SMPS (C6W) containing the tungsten oxide is 3.32 eV and since the initial pore diameter of the porous silica is 1.12 nm, as shown in the Table 2, it is found that the tungsten oxide was formed only in the first pores (micro pores).

Example 3

In this example, minute particles of gold (Au) are synthesized by using porous silica as a template.

<3-1> Synthesis of Porous Silica

By the same method as the method of porous silica described in <1-1> of (example 1), porous silica (C4VSMPS) of C4TAC and TEVS was formed.

<3-2> Synthesis of Minute Particles

Minute particles of gold (Au) were synthesized by using the above porous silica (C4VSMPS) as a template. After grinding 2 g of the above porous silicas in a mortar into powder, the resulting powder was put into a two-neck flask and maintained under decompression for several hours to overnight so that adsorbed materials such as water were removed (decompression drying process). Then, 0.2 M of a chloroauric acid aqueous solution was added to the porous silica and the powder in the aqueous solution was stirred and vibrated under decompression so that the aqueous solution was uniformly infiltrated into the pores (impregnation process). The added amount of the chloroauric acid aqueous solution at one time of the impregnation process was about the same as the pore volume (TPV, [$cm^3/g$])×2 g or less. Then, the decompression drying process was carried out again. After repeating these impregnation process and decompression drying process several times, the recovered sample was washed with water, and, carried out decompression drying process. Then, the resulting sample was baked in an Ar atmosphere containing about 4% of $H_2$ (hydrogen) at 350° C. for about 2 hours, chloroauric acid was reduced, and porous silica containing minute particles containing gold was obtained.

Figure 6A:
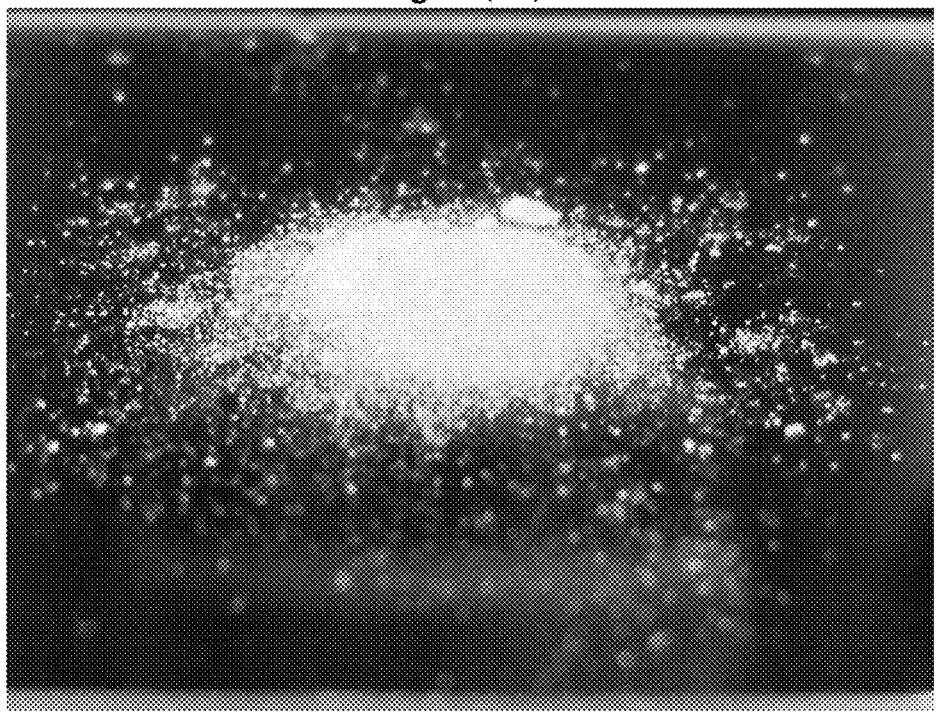
FIG. 6(a) is a photograph showing porous silica containing gold obtained in example 3.
Figure 6B:
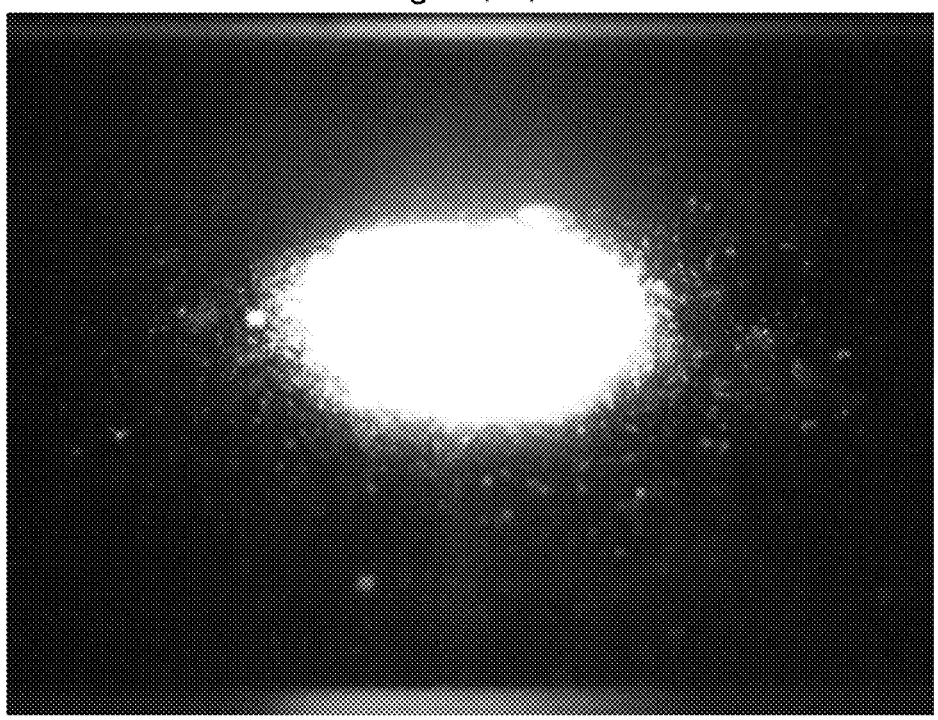
FIG. 6(b) is a photograph showing the porous silica containing gold under irradiation of ultraviolet rays.

When the resulting porous silica containing gold was irradiated with an ultraviolet ray with a wavelength of 360 nm to 370 nm, a light-emitting phenomenon was visually observed. FIG. 6(A) shows a photograph of the resulting porous silica containing gold, and FIG. 6(B) shows a photograph of the porous silica containing gold under the irradiation with the ultraviolet ray. Thus, it was found that the porous silica had a function as a light-emitting (fluorescent) material.

Figure 7:
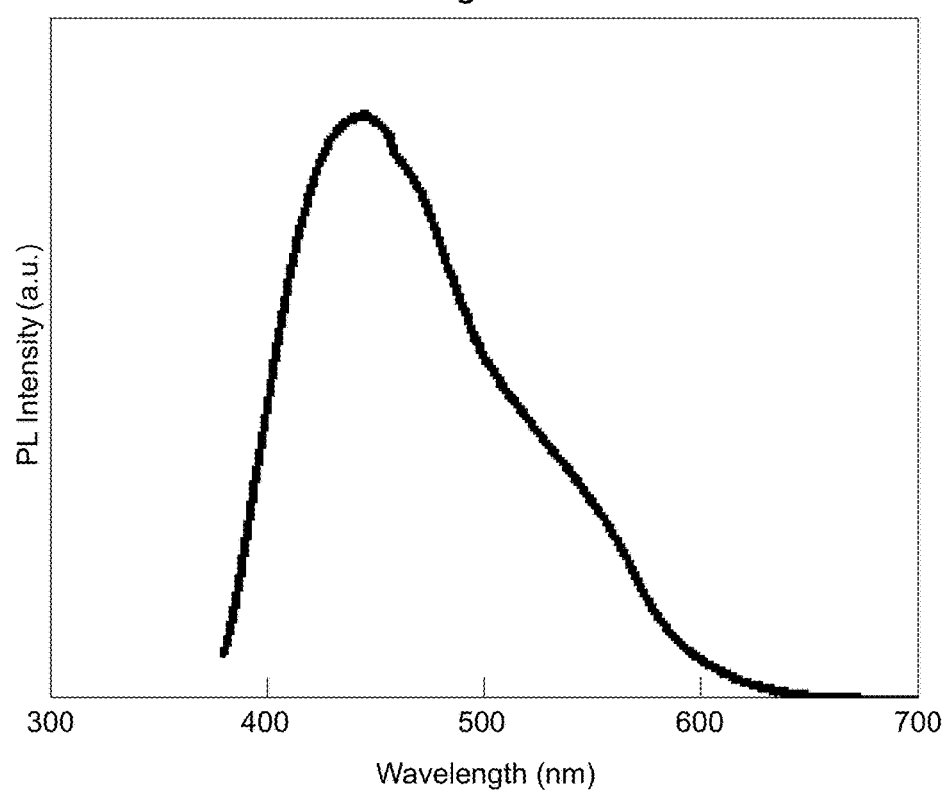
FIG. 7 shows a light-emission spectrum as light emission of the porous silica containing gold obtained in example 3.

FIG. 7 shows a light-emission spectrum (Ex. 360 nm) at the light-emitting phenomenon. The horizontal axis shows the wavelength ([nm]), and the vertical axis shows the PL intensity (PL; Photoluminescence, [a.u.]). The light-emission spectrum was measured by spectral fluorescent photometer (PL) FP-6500 (manufactured by JASCO Corporation).

Example 4

In this example, minute particles of carbon (C) are synthesized by using porous silica as a template.

<4-1> Synthesis of Porous Silica

By using the same method as the method of porous silica described in <1-1> of (example 1), porous silica (C6VSMPS) of C6TAB and TEVS was formed.

<4-2> Synthesis of Minute Particles

Next, minute particles of carbon (C) were synthesized by using the above porous silica (C6VSMPS) as a template. After grinding 2 g of the above porous silicas in a mortar into powder, 0.26 M of an aqueous solution of glucose ($C_6H_{12}O_6$) was added, the resulting powder in the aqueous solution was stirred and vibrated, and the aqueous solution was uniformly infiltrated into the pores (impregnation process). Then, the recovered sample was washed with water and baked in the air at 300° C. for about 2 hours, and porous silica containing minute particles containing carbon was obtained by carbonizing the glucose. Instead of the above baking process, the glucose may be carbonized by immersing in concentrated sulfuric acid for several hours. In this example, glucose was used; however, by using a solution of an organic compound comprising an appropriate molecule size, the organic compound may be carbonized by baking process. When a saccharide was used as the organic compound, it can be carbonized by dehydrating reaction by sulfuric acid.

Figure 8A:
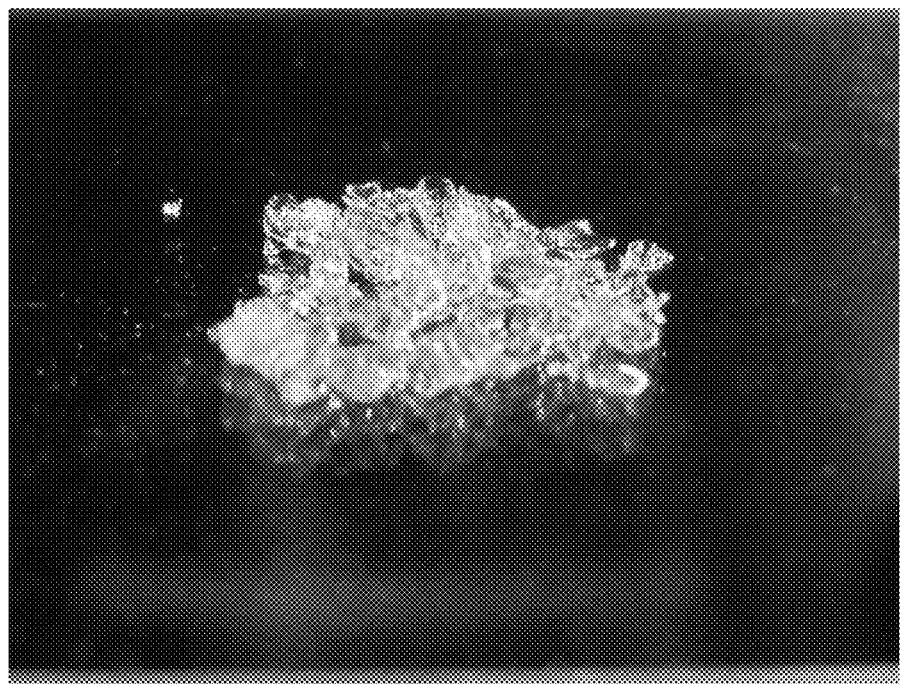
FIG. 8(a) is a photograph showing porous silica containing a carbon obtained in example 4.
Figure 8B:
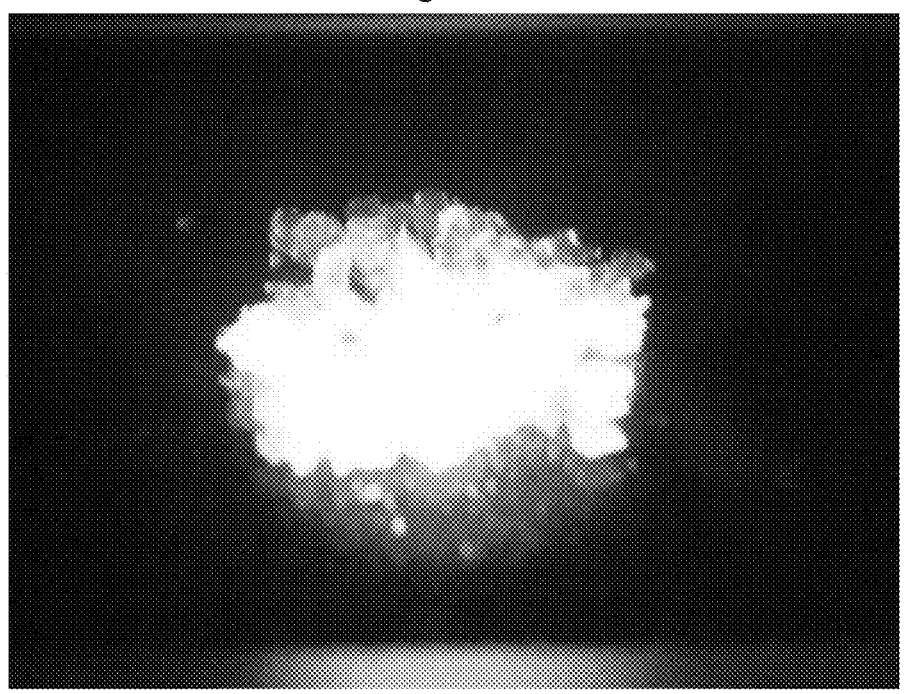
FIG. 8(b) is a photograph showing the porous silica containing the carbon under irradiation of ultraviolet rays.

When the resulting porous silica containing carbon was irradiated with ultraviolet ray with a wavelength of 360 to 370 nm, a light-emitting phenomenon was visually observed. FIG. 8(A) shows the resulting porous silica containing carbon, and FIG. 8(B) shows the porous silica containing carbon under the irradiation with ultraviolet ray. Thus, it was found that the porous silica had a function as a light-emitting (fluorescent) material.

Figure 9:
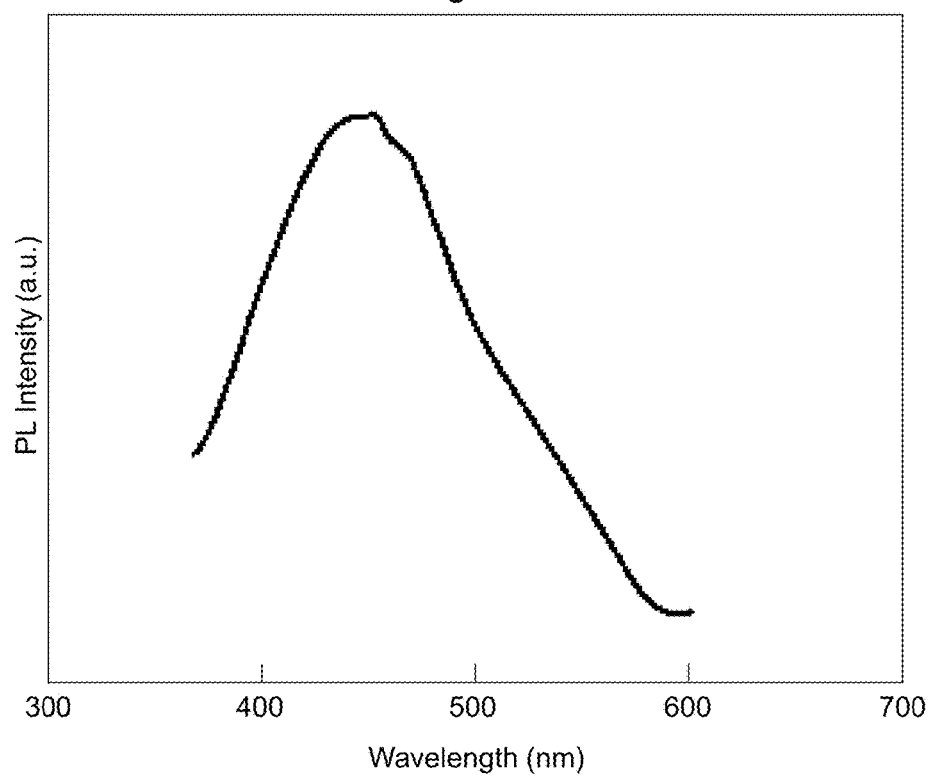
FIG. 9 shows a light-emission spectrum as light emission of the porous silica containing a carbon obtained in example 4.

FIG. 9 shows a light-emission spectrum (Ex. 320 nm) at the light-emitting phenomenon. The horizontal axis shows the wavelength (Wavelength, [nm]), and the vertical axis shows the PL intensity (PL; Photoluminescence, [a.u.]). The light-emission spectrum was measured by spectral fluorescent photometer (PL) FP-6500 (manufactured by JASCO Corporation).

Embodiment 2

In embodiment 1, minute particles of a metal compound ($WO_3$), metal (Au) or carbon (C) were contained in porous silica; however, in this embodiment, minute particles of bismuth vanadate ($BiVO_4$) were contained therein.

The bismuth vanadate has been used as a yellow pigment as an alternate material for cadmium yellow and chrome yellow of toxic materials, and functions as a photo-catalyst decomposing water (hydrogen production) and organic substances. It also functions as converting carbon dioxide ($CO_2$) into ethanol ($C_2H_5OH$). However, its catalytic ability is low and its high efficiency is desired.

Generally, in the fixing reaction of a carbon dioxide by the photo-catalyst, methane, methanol, formaldehyde or formic acid with one carbon atom is mostly produced. In contrast, the carbon dioxide ($CO_2$) can be converted into ethanol ($C_2H_5OH$) with two carbon atoms by the above bismuth vanadate. This formation mechanism of ethanol is that ion reaction of a carbon radical (C.) intermediate generated by reducing the carbon dioxide is preferentially dimerized on the catalyst surface. The reason of preferential reaction is considered a peculiar crystal surface of the bismuth vanadate.

To improve the activity with this peculiar characteristic maintained, it is necessary to increase the reducing level with the crystal structure maintained. To achieve this, it is effective to form the bismuth vanadate into sub-nano particles to increase the band gap energy by the quantum size effect.

The above bismuth vanadate can be synthesized by a bismuth salt such as bismuth nitrate ($Bi(NO_3)_3$) and a vanadic acid salt (vanadate) such as ammonium ortho vanadic acid ($NH_4VO_3$), to react in an aqueous solution. That is, to synthesize bismuth vanadate, bismuth cations and vanadic acid anions are reacted in water.

Example 5

In this example, minute particles of bismuth vanadate are synthesized by porous silica as a template.
<5-1> Synthesis of Porous Silica
By the same method as the method of porous silica described in <1-1> of (example 1), porous silica (C6VSMPS) of C6TAB and TEVS was formed.
<5-2> Synthesis of Minute Particles
Next, minute particles of bismuth vanadate were synthesized by the above porous silica (C6VSMPS) as a template.

After grinding 2 g of the above porous silicas in a mortar into powder, the resulting powder was put in a two-neck flask, and maintained under decompression for several hours to overnight and adsorbed substances such as water were removed (decompression drying process). Moreover, 0.6 M of $Bi(NO_3)_3 \cdot 5H_2O$ and 0.6 M of $NH_4VO_3$ were respectively dissolved in 2 M of nitric acid and solutions of 0.2 M were obtained. These two solutions were mixed and respective ions in the mixed solution were dissolved at a concentration of 0.1 M was obtained. This solution was added to the above powder of porous silica, and the resulting powder in the aqueous solution was stirred and vibrated, and the aqueous solution was uniformly infiltrated into the pores (impregnation process). The added amount of the solution per impregnation process was about the same as the pore volume (TPV, [$cm^3$/g])×2 g or less. Then, the decompression drying process was carried out again. After repeating these impregnation process and decompression drying process several times (about 1 to 4 times), the sample after the drying process was baked in the air at 450° C. for about 2 hours and porous silica containing minute particles containing bismuth vanadate in the pores was obtained.

The resulting porous silica containing bismuth vanadate was observed by a transmission-type electron microscope (TEM). Specifically, the shape and particle size of the sample were measured by FE-TEM (TECNAI F20: FEI). The sample was prepared by dispersing a ground sample over a copper mesh with a micro-grid film.

Figure 10:
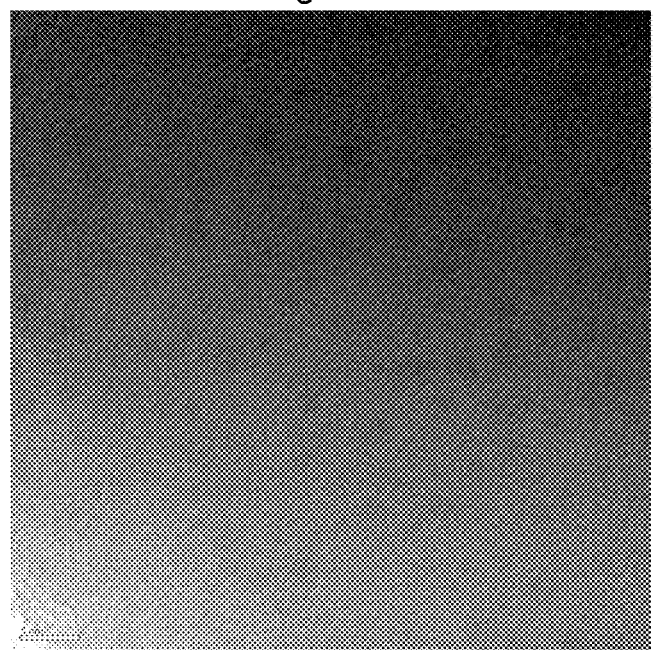
FIG. 10 shows an image of a transmission-type electron microscope (TEM image) of porous silica containing bismuth vanadate obtained in example 5.

FIG. 10 shows a transmission-type electron microscopic image (TEM image) of the resulting porous silica containing tungsten oxide. A structure of bismuth vanadate contained in the pores of porous silica was confirmed.

On the resulting porous silica containing bismuth vanadate, electron spectra (visible-ultraviolet ray absorption spectra) were found by ultraviolet-visible ray absorption photometer (UV-Vis) V-550 (manufactured by JASCO Corporation), and the band gap energy was found based upon Tauc plots.

Figure 11:
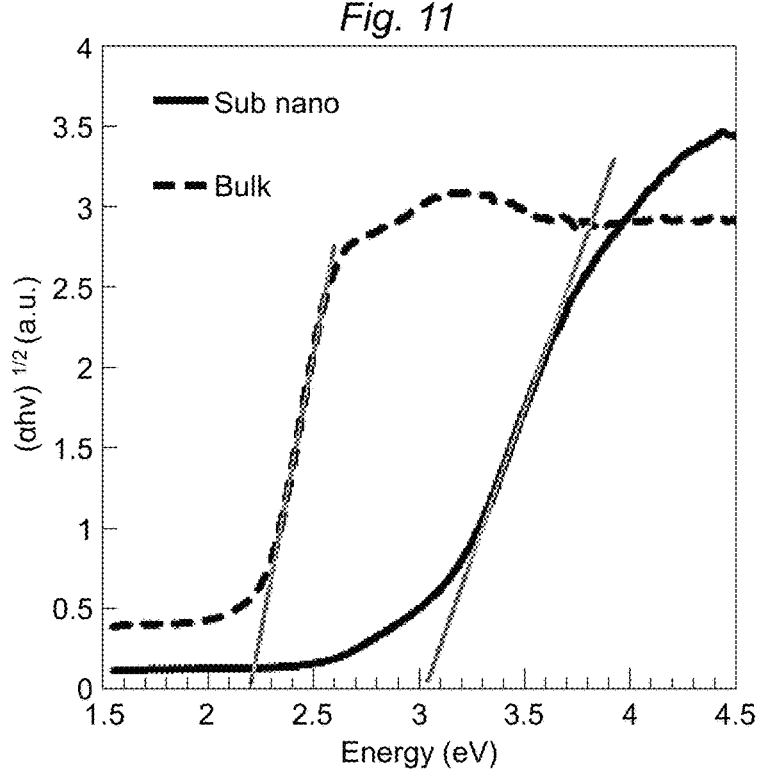
FIG. 11 shows Tauc plots of the porous silica containing bismuth vanadate (solid line) obtained in example 5 and the bulk bismuth vanadate (broken line).

FIG. 11 shows Tauc plots of the resulting porous silica containing bismuth vanadate (solid line) and the bulk bismuth vanadate (broken line). The axis of abscissa shows the photon energy E (Energy, hv[eV]), and the vertical axis shows the root $((\alpha h v)^{1/2})$ of the product of the absorbance ($\alpha$) and the photon energy (hv[eV]). When the hand gap energy (Eg) was calculated from the graph shown by the solid line in FIG. 11, the Eg of the resulting porous silica containing bismuth vanadate was about 3.0 eV, and the Eg of the bulk bismuth vanadate (broken line) was 2.2 eV. Since the band gap energy was increased from 2.2 eV to 3.0 eV, a remarkable quantum size effect was confirmed.

The catalyst activity can be improved by utilizing the porous silica containing bismuth vanadate as a photo-catalyst, and the photo-catalyst can also function with high efficiency. Particularly, the catalyst activity of the photo-catalyst function can be improved and it can converse with high efficiency upon converting carbon dioxide ($CO_2$) to ethanol ($C_2H_5OH$).

As described above in detail, since the porous silica containing bismuth vanadate of this embodiment can reduce carbon dioxide ($CO_2$) causing a factor of global warming, and also generate ethanol ($C_2H_5OH$) of an energy source, it is applicable to a widely usable technique for preventing the global warming and for recyclable energy.

A Synthesizing method using a dendrimer as a template is also proposed as the formation method for minute particles. However, this method produces a metal oxide or metal minute particles by heat treatment or reduction treatment of a dendrimer consisting of a nitrogen containing organic compound of which nitrogen position was coordinated by a metal cation. Therefore, it is difficult to synthesize a substance such as bismuth vanadate generated by reacting a cation with an anion because both ions have to be coordinated inside a dendrimer, and the dendrimer has to be synthesized to form a special structure.

In contrast, in this embodiment, a bismuth cation and a vanadic acid anion can be easily reacted in a solution within pores and porous silica containing bismuth vanadate can be efficiently obtained.

Embodiment 3

In embodiment 1, minute particles of metal compound ($WO_3$), metal (Au) or carbon (C) were contained in porous silica, and in embodiment 2, bismuth vanadate ($BiVO_4$) was contained, and in this embodiment, copper oxide minute particles (CuO) were contained.

CuO is a semiconductor with a band gap at about 1.3 eV. Although the band gap energy is small compared with that of other semiconductors, its conduction band level is higher than that of titania ($TiO_2$). A $TiO_2$—CuO composite photo-catalyst-based material utilizing holes of $TiO_2$ and electrons of CuO has been proposed by applying this characteristic. Since the band gap energy is small in a bulk state, a visible light response can be maintained even if the conduction band level is raised by the quantum size effect. It is possible to design a highly functional photo-catalyst material with a very high conduction band level as well as an excellent visible light response by applying this characteristic.

Example 6

In this example, copper oxide minute particles (CuO) are synthesized by using porous silica as a template.

<6-1> Synthesis of Porous Silica

By using the same method as the method of porous silica described in <1-1> of (example 1), for comparison, porous silicas (C6SMPS and C16MPS) of C6TAB and C16TAC were formed.

<6-2> Synthesis of Minute Particles

Next, copper oxide minute particles (CuO) were synthesized by using porous silica as a template. After grinding 2 g of the above two kinds of porous silicas in a mortar into powder, this was put into a two-neck flask and reduced the pressure by a vacuum pump for several hours to overnight to adsorb materials such as water (decompression drying process). Then, the decompression operation was temporarily stopped, and 0.2 M (mol) of a copper acetate ($Cu(AcO)_2$) aqueous solution was added to each porous silica. At this time, the inside of the flask was maintained at a negative pressure. The aqueous solution and the powder were stirred and vibrated to uniformly infiltrate into the pores (impregnation process). The added amount of the copper acetate aqueous solution at the impregnation process was about the same as the pore volume (TPV, [$cm^3$/g])×2 g or less. Then, the decompression drying process was carried out again. After repeating these impregnation process and decompression drying process several times, the dried sample was baked in the air at 400° C. to 600° C. for about 3 hours and porous silica containing minute particles of CuO, was obtained.

Figure 12:
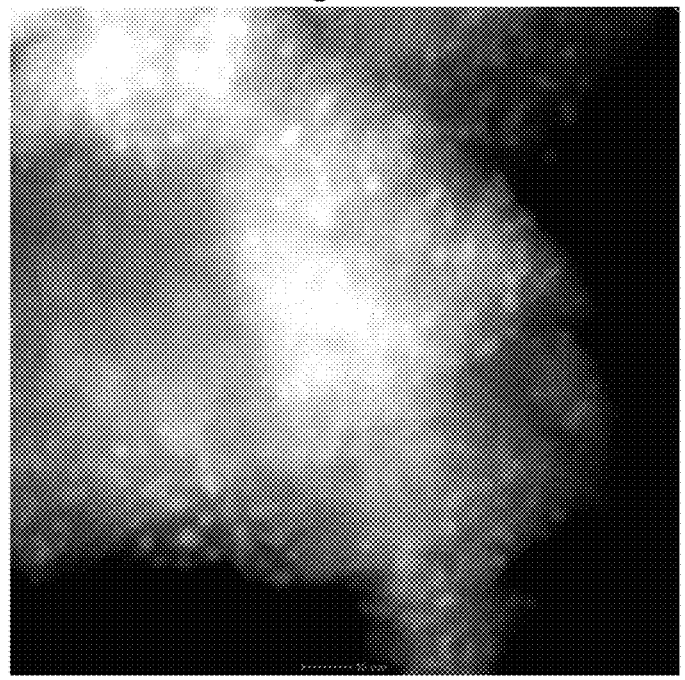
FIG. 12 shows an image obtained by a high angle annular dark field scanning transmission electron microscope (HAADF-STEM image) of CuO particles obtained by C16MPS as a template in example 6.
Figure 13:
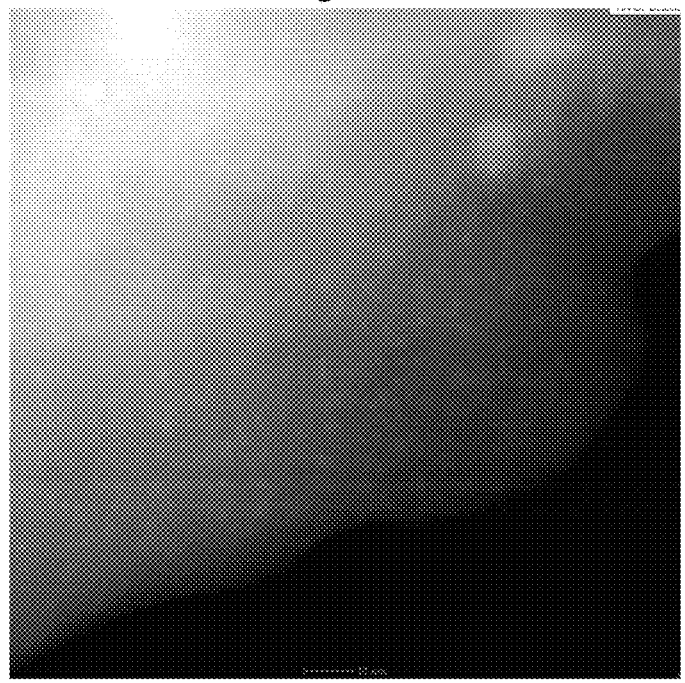
FIG. 13 shows an HAADF-STEM image of CuO particles obtained by C6SMPS as a template in example 6.

FIG. 12 shows an image obtained by a high angle annular dark field scanning transmission electron microscope (HAADF-STEM image) of CuO particles obtained by using C16MPS as a template. White-looking dots indicate particles contained, and it is observed that CuO particles of 2 nm or more are uniformly dispersed. FIG. 13 shows an HAADF-STEM image of CuO particles obtained by using C6SMPS as a template. It is observed that CuO particles of 1 nm or less are present in a highly dispersed manner in silica.

Figure 14:
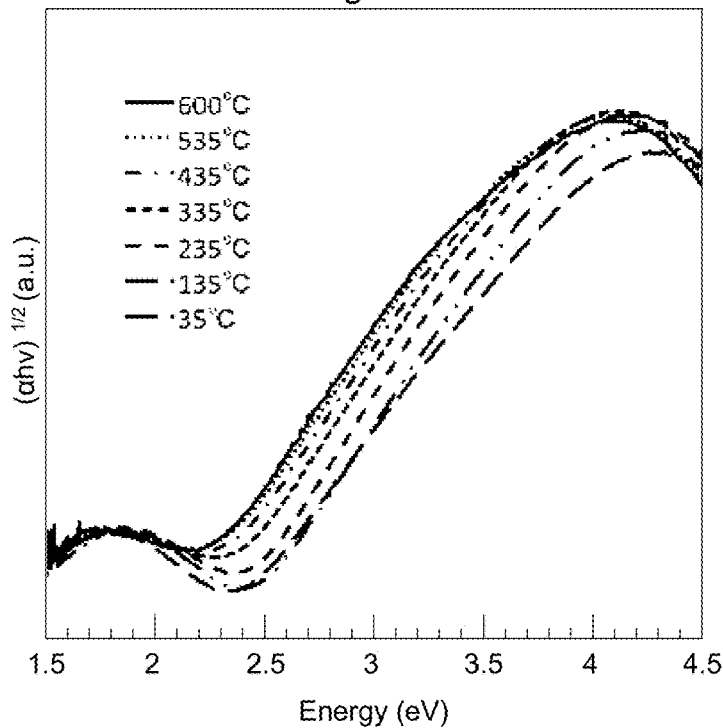
FIG. 14 shows Tauc plots at 35 to 600° C. of CuO particles obtained by C16MPS as a template in example 6.
Figure 15:
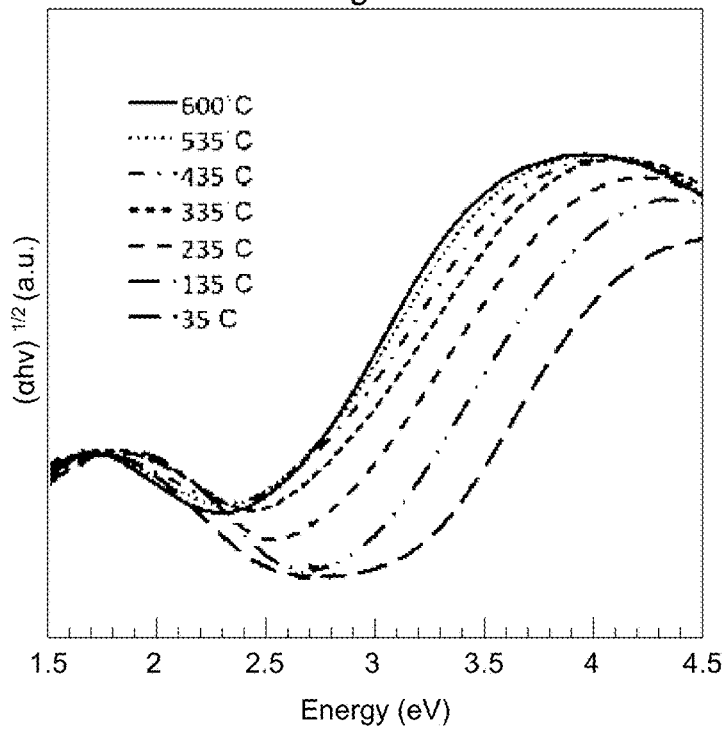
FIG. 15 shows Tauc plots at 35 to 600° C. of CuO particles obtained by C6SMPS as a template in example 6.

FIG. 14 shows Tauc plots found from ultraviolet-visible ray absorption spectra of CuO particles obtained by using C16MPS as a template. The Figure also shows a change of each Tauc plot by temperature change of the sample (35° C. to 600° C.) (the same applies to FIG. 15). From the graph of 35° C., the band gap located at the position of about 1.3 eV in the bulk state is observed the increase to about 2.3 eV. As shown in FIG. 15 of CuO particles obtained by using C6SMPS as a template, the band gap energy is further increased to about 3.2 eV (see graph of 35° C.). This is due to the remarkable quantum size effect below 1 nm. Moreover, a broad peak located near 800 nm is due to a d-d transition of $Cu^{2+}$. Though this absorption could not be observed in normal CuO due to absorption of an indirect transition, it was observed for the first time by a remarkable blue shift of the absorption end due to the quantum size effect. As a result, while the color of bulk CuO is black, the resulting particles of CuO particles obtained by using C16MPS as a template exhibit a green color, and the resulting particles of CuO particles obtained by using C6SMPS exhibit a blue color.

The resulting particles exhibit a remarkable thermochromism (color change due to temperature change). As described above, FIGS. 14 and 15 also show Tauc plots found from ultraviolet-visible ray absorption spectra of the resulting particles at 35° C. to 600° C. As indicated by each figure, the absorption end was shifted toward the long wavelength side depending on the temperature rise.

Figure 16:
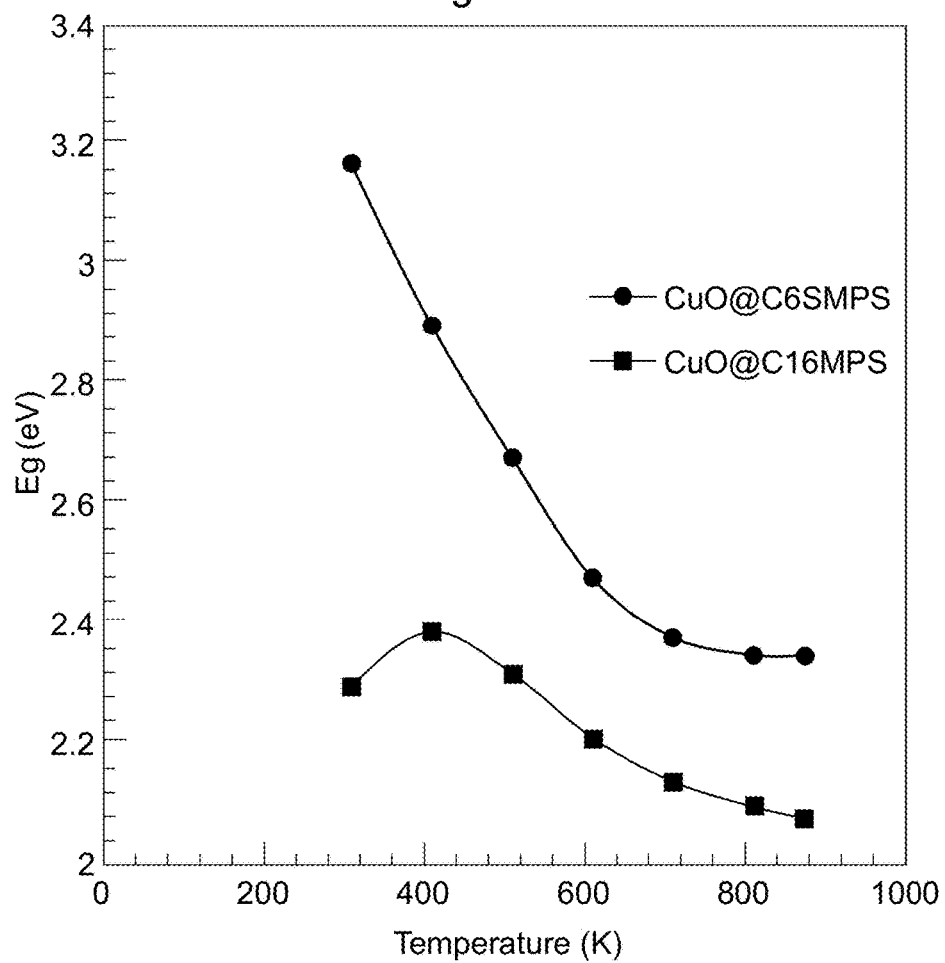
FIG. 16 shows a temperature dependence of band gaps of the CuO particles obtained by C6SMPS as a template and the CuO particles obtained by C16MPS as a template in example 6.

FIG. 16 shows temperature dependence of the band gap energy of each sample. The horizontal axis shows the band gap energy (Eg; eV) and the vertical axis shows the temperature (Temperature; K). The band gap temperature dependence of CuO particles (CuO@C16MPS) obtained by using C16MPS as a template was about 0.8 meV/K same as the value reported in the bulk state while the band gap temperature dependence of CuO particles (CuO@C6SMPS) obtained by using C6SMPS as a template was about 2.3 meV/K, which was larger. Therefore, it was observed that the temperature dependence was extremely improved by forming sub-nano particles. It was also observed that these thermochromisms are reversible and when it is cooled to room temperature, the original spectra are recovered. From the results of thermo-gravimetry in the same temperature areas, it was found that neither chemical reactions such as oxidation and hydration nor phase transitions occurred even during both temperature rise and drop.

It was visually observed that with this change of absorption spectra, remarkable thermochromism from green or blue to yellow occurred. It is considered that the mechanism of this thermochromism is due to electron-phonon coupling of which lattice vibrations affect to electron orbits. In zinc oxide of a typical inorganic substance exhibiting thermochromism, a color change from white to yellow is observed due to a temperature rise. It is also considered due to the electron-phonon coupling. This behavior is also observed in CuO in the bulk state; however, since the bulk body has a black color, no color change is visually observed. The reason of the remarkable thermochromism observed in CuO sub-nano particles is due to the shift of the absorption end of an indirect transition to the ultraviolet region due to the quantum size effect and due to the large change of a red shift width of the absorption end relative to a temperature change. These phenomena are never observed in normal nano particles, and are first realized by the fact of this embodiment that sub-nano particles can present in a monodispersed silica without sintered even at a high temperature.

It is found that the temperature dependence of the band gap energy is remarkably improved by forming sub-nano particles. These materials with thermal stability of silica are expected to be applied to a temperature indicator. Its light-emission wavelength depending on temperatures can be also controlled by forming a semiconductor light-emitting material into sub-nano particles, and a material with a novel functionality can be produced.

Embodiment 4

This embodiment will explain a synthesis of minute particles (quantum dots) of a metal oxide by immersion method and baking process.

Example 7

In this example, minute particles (quantum dots) of copper oxide (CuO) are synthesized by using porous silica as a template.

For example, monolithic porous silica in example A or the like of embodiment 1 was immersed in an aqueous solution (precursor solution) of a metal salt. The concentration of the aqueous solution of the metal salt is preferably from 0.5 M or more to 0.8 M or less. The lower the concentration is, the smaller the particle size is. Then, particles of which diameter is smaller than the pore diameter can be synthesized by lowering the concentration of the aqueous solution of the metal salt (precursor solution). Thus, the diameter of particles (here, copper oxide minute particles) contained in the porous silica can be finely adjusted by further lowering the concentration of the aqueous solution (precursor solution) of the metal salt as well as the adjustment of the pore diameter of porous silica in example A or the like in embodiment 1.

In this example, 0.6 M (mol/L) of copper nitrate aqueous solution was used as the aqueous solution (precursor solution) of a metal salt, and monolithic porous silica (pore diameter: 3.0 to 0.7 nm) was immersed therein. During the immersion, air inside the pores of the porous silica was released, and the precursor solution was filled therein. When air is no longer released, it is defined as the completion of the immersion. By immersion from about half day to two days, the substitution between air and the precursor solution is completed.

After completing the immersion, porous silica is removed from the precursor solution, and the outer surface is washed. An alcohol such as ethanol is preferably used to wash. Instead of alcohols, water may be used. However, since a solute (metal salt) might be eluted when water was used, alcohols are preferably used.

After washing, the resulting porous silica is dried, and minute particles of the metal salt are deposited in the pores. As drying method, vacuum drying or freeze-drying is preferably used. Natural drying or hot-air drying may also be used; however, it can be quickly dried by the vacuum drying or freeze-drying and more uniform particles can be obtained.

In this example, the porous silica was dried by vacuum drying and minute particles of the metal salt were deposited in the pores.

Then, minute particles of the metal oxide (copper oxide minute particles) can be synthesized by baking the porous silica depositing minute particles of the metal salt in the pores in the air.

Figure 17:
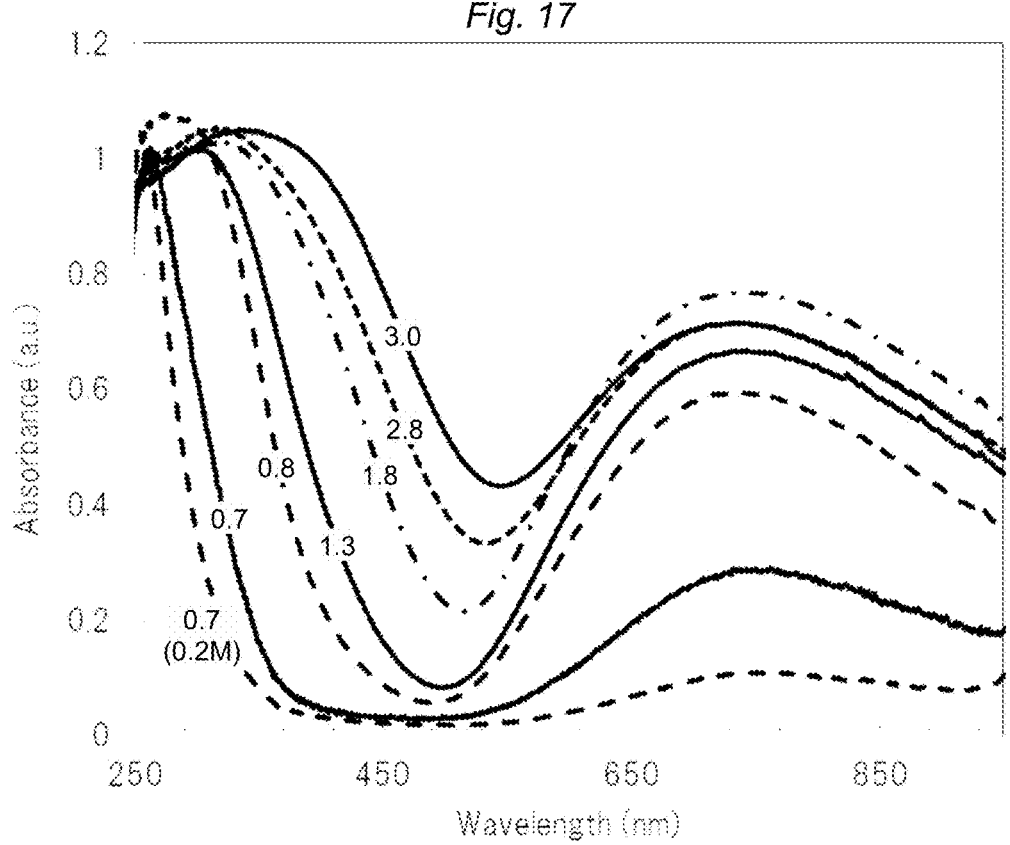
FIG. 17 shows a UV-Vis spectrum of copper oxide minute particles synthesized by porous silica of which different pore diameters as templates.

In this example, the baking process was carried out at 450° C. in the air for 1 hour, and copper oxide minute particles were obtained. FIG. 17 shows UV-Vis spectra of copper oxide minute particles synthesized by using porous silicas with different pore diameters as templates. The horizontal axis of the graph shows the wavelength [nm] and the vertical axis shows the absorbance [a.u.]. Subscripts in each graph indicate pore diameters (nm). As shown in FIG. 17, in each graph, a spectrum peak of copper oxide is observed between 250 to 450 nm. It was also found that the spectrum peak is shifted leftward in the order of pore diameters (nm) of 3.0, 2.8, 1.8, 1.3, 0.8 and 0.7 nm from the right side. Even the vale of 0.7 nm in the pore diameters (nm) is same, the spectrum peak of the graph (0.7 (0.2 M)) where the concentration of the copper nitrate aqueous solution is lowered to 0.2 M is further shifted leftward compared with that of the graph (0.7) with the concentration of the copper nitrate aqueous solution being set to 0.6 M. Thus, it was found that copper oxide minute particles depending on the pore diameters were synthesized and that the particle size of the minute particles became smaller by lowering the concentration of the copper nitrate aqueous solution.

Moreover, copper oxide in the bulk state has band gap energy of about 1.3 eV, and is visually black. In contrast, it was observed that the copper oxide minute particles (quantum dots of metal oxide) had band gap energy remarkably increased by the quantum size effect and was visually green or blue. Table 3 shows a relationship between the pore diameter (Dpore; nm) of porous silica containing the minute particles (metal oxide quantum dots) of copper oxide and band gap energy (Eg; eV) of the minute particles of the copper oxide. The band gap energy was found from Tauc plots.

TABLE 3

| Dpore | Eg (eV) |
| --- | --- |
| 0.82 | 2.85 |
| 1.28 | 2.55 |
| 2.26 | 2.10 |
| 3.27 | 1.75 |

Thus, In this example, it is found that minute particles (quantum dots) of the metal oxide can be easily synthesized by immersing the monolithic porous silica (for example, lump with particles of a diameter of 1 mm or more) without grinding (miniaturizing) and baking. It is also found band gap energy can be controlled by controlling the particle diameter of the particle material contained. This implies that the light-emission spectrum and catalyst activity can be precisely controlled, and this method is effectively applied to, for example, a highly functional photo-catalyst material or the like with a very high conduction band level and a visible light response.

Minute particles of metal oxide (quantum dots) of not only copper oxide but also chromium or cobalt oxide can be also synthesized (see example 12) by chromium nitrate or cobalt nitrate.

Embodiment 5

This embodiment will explain a synthesis of minute particles (quantum dots) of a metal by immersion method and baking process.

Example 8

In this example, minute particles (quantum dots) of silver (Ag) are synthesized by using porous silica as a template.

In this case, for example, monolithic porous silica in example A or the like of embodiment 1 was immersed in an aqueous solution (precursor solution) of silver nitrate. The concentration of the aqueous solution of silver nitrate is preferably from 0.5 M or more to 0.8 M or less. In this case, a particle of which diameter is smaller than the pore diameter can be also synthesized by lowering the concentration of the aqueous solution of the metal salt (precursor solution).

In this example, 0.6 M of silver nitrate aqueous solution was used and monolithic porous silica (pore diameter: 3.0 to 0.7 nm) was immersed therein. After completing the immersion, porous silica was removed from the precursor solution, and the outer surface was washed by alcohols such as ethanol. After washing, the resulting porous silica is vacuum-dried and minute particles of the silver nitrate were deposited inside the pores.

Then, minute particles of silver were obtained by baking the porous silica at 600° C. in the air for 3 hours. Since it showed fluorescence by irradiation of ultraviolet rays, it was confirmed that the metal contained therein was silver. Since metal silver can exist more stable than silver oxide in the above baking temperature, minute particles of silver (silver quantum dots) can be synthesized. The resulting silver minute particles (silver quantum dots) exhibited yellow light-emission under irradiation with an ultraviolet ray of 365 nm.

Thus, the resulting synthesized product can be obtained as metal (minute particles of metal) without forming metal oxide depending on metals (metal compounds) forming the precursor solution and even if baked after the immersion. The minute particles of the metal can be recovered by re-baking even if the resulting metal is slightly oxidized by oxygen or the like in the air.

Minute particles of silver oxide can be also synthesized by reacting the porous silica with oxygen. Since fluorescence peculiar to the metal minute particles is no longer shown when an oxide is formed, the oxidation can be confirmed.

Thus, the above minute particles (silver quantum dots) of silver show fluorescence under irradiation of ultraviolet rays, and are applicable to a light-emitting element, bio-imaging or the like.

Embodiment 6

This embodiment will explain a method for synthesizing minute particles (quantum dots) of metal by reducing minute particles (quantum dots) of a metal oxide obtained by immersing method and baking process.

Example 9

In this example, minute particles of metal are synthesized by reducing minute particles (quantum dots) of metal oxide contained in porous silica and synthesized in example 7. As the reducing agent, for example, a hydrogen peroxide aqueous solution may be used.

In this case, minute particles of a metal oxide of copper, chromium, or cobalt, which were synthesized in example 7, were used as a precursor for minute particles, and minute particles of metal (quantum dots) were obtained by immersing these in a 15% hydrogen peroxide aqueous solution.

Figure 18:
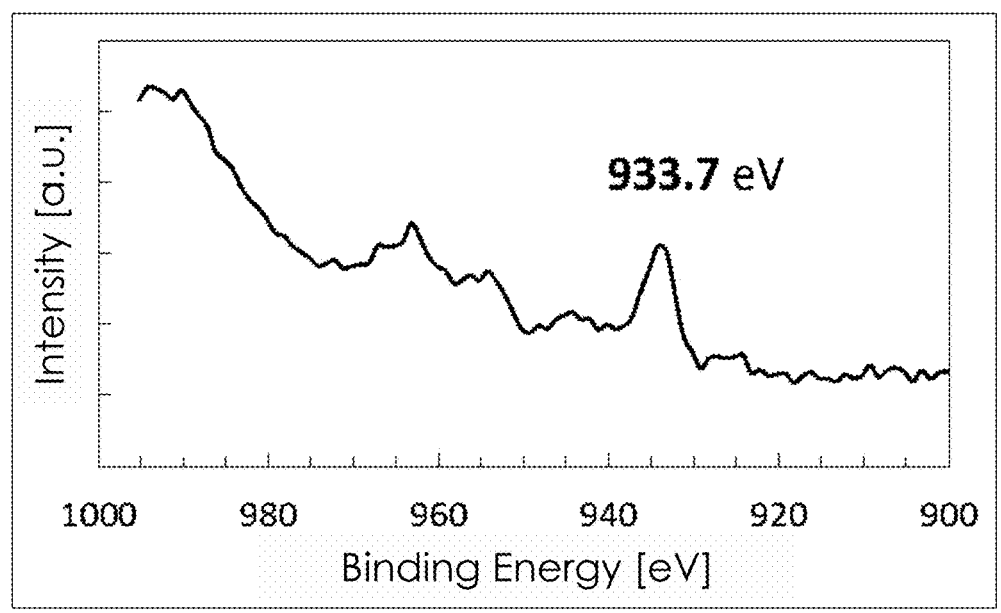
FIG. 18 shows an XPS (X-ray photo-electric spectrum) spectrum of minute particles (quantum dots) of copper oxide.
Figure 19:
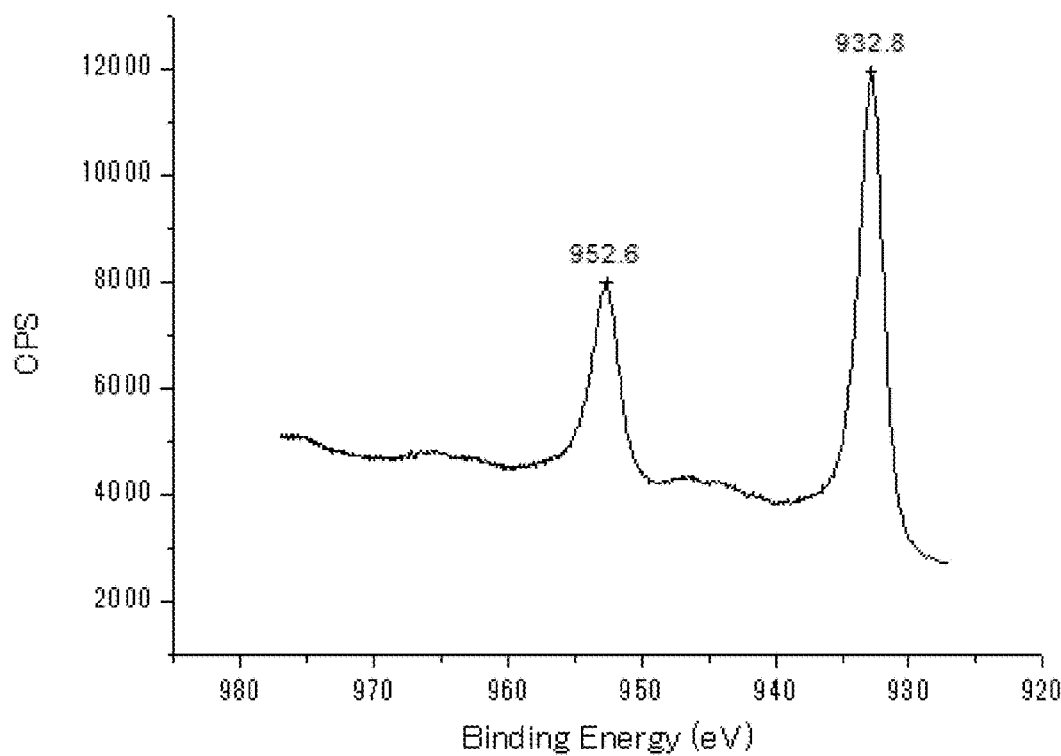
FIG. 19 shows an XPS spectrum of minute particles (quantum dots) of copper generated by reducing reaction.

FIG. 18 shows XPS spectra (X-ray photon spectra) of minute particles (quantum dots) of copper oxide, and FIG. 19 shows XPS spectra of copper minute particles (quantum dots) generated by reduction reaction. The horizontal axis shows the binding energy ([eV]), and the vertical axis shows the intensity ([a.u.], CPS).

In the spectra of FIG. 18, since a peak of 2p3/2 orbit of copper (Cu) was observed at 933.7 eV and a satellite peak was also observed, it was confirmed that the minute particles were copper oxide (CuO). In the spectra of FIG. 19, a peak was observed at 932.8 eV and the generation of minute particles of metal copper (0 valence) was confirmed.

Figure 20:
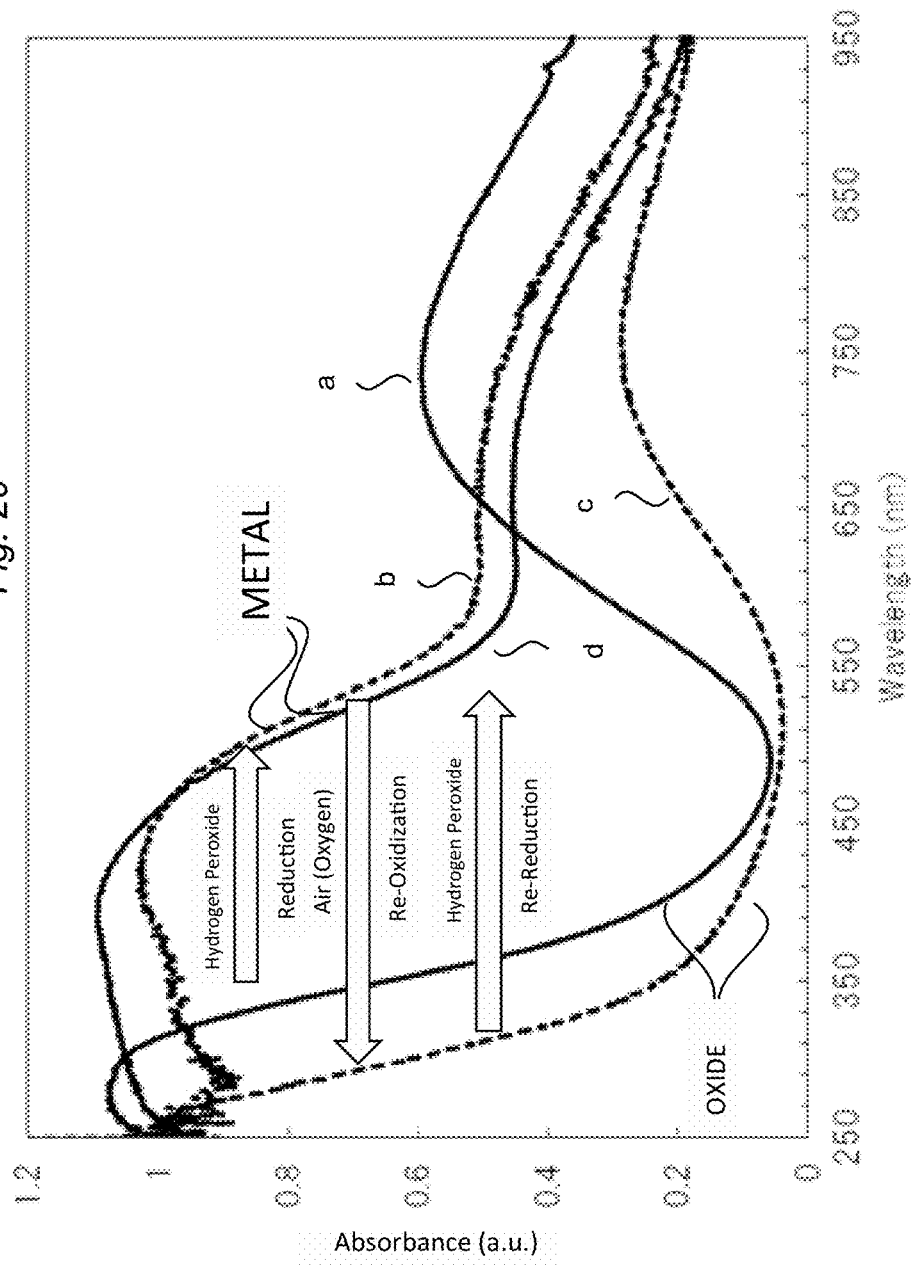
FIG. 20 shows ultraviolet-visible ray absorption (UV-Vis) spectrum as both oxidation and reduction.

FIG. 20 shows ultraviolet-visible ray absorption (UV-Vis) spectra at oxidation and reduction. The horizontal axis shows the wavelength [nm], and the vertical axis shows the absorbance [a.u.]. Copper minute particles obtained by reducing copper oxide minute particles showing a spectrum of the graph-a with hydrogen peroxide showed a spectrum of the graph-b. Moreover, copper oxide minute particles obtained by re-oxidizing copper minute particles showing the spectrum of the graph-b were with oxygen in the air showed a spectrum of the graph-c. Furthermore, copper minute particles obtained by re-reducing copper oxide minute particles showing a spectrum of the graph-c with hydrogen peroxide showed a spectrum of the graph-d. Thus, it is observed that the oxidation and reduction reactions proceed reversibly.

As described above, from the present example, it is found that metal contained in porous silica can be oxidized and metal oxide contained in porous silica can be reduced by simple oxidation and reduction reactions. It is also found that since these reactions proceed reversibly, an object substance (for example, metal or metal oxide) can be easily reproduced.

Embodiment 7

This embodiment will explain synthesis of minute particles (quantum dots) of metal by reduction process using immersing method and a reducing agent.

Example 10

In this example, minute particles (quantum dots) of copper (Cu) are synthesized by using porous silica as a template.

In this case, for example, the monolithic porous silica in example A or the like in embodiment 1 was immersed into an aqueous solution (precursor solution) of a metal salt. The concentration of the aqueous solution of the metal salt is preferably from 0.5 M or more to 0.8 M or less. In this example, 0.6 M copper nitrate aqueous solution was used as the aqueous solution of the metal salt (precursor solution), and monolithic porous silica (pore diameter: 0.7 nm) was immersed therein. During the immersion, air in the pores of the porous silica was released, and the precursor solution was filled therein. The immersion completes when the air is no longer released. After the immersion from about half day to two days, the substitution between air and the precursor solution is completed.

After completion of the immersion, porous silica was removed from the precursor solution, and the outer surface was washed with alcohols such as ethanol. After washing, the resulting porous silica was dried, and minute particles of the metal salt were deposited inside the pores. As the drying, a vacuum drying or a freeze-drying is preferably used. In this example, the porous silica was dried by the vacuum drying and minute particles of the metal salt (here, copper nitrate) were deposited in the pores.

Then, minute particles of metal copper was synthesized by directly reducing the porous silica depositing minute particles of the metal salt in the pores with a reducing agent. In this example, minute particles of metal copper were synthesized by immersing the porous silica depositing minute particles of the metal salt in the pores in 15% hydrogen peroxide aqueous solution.

Figure 21:
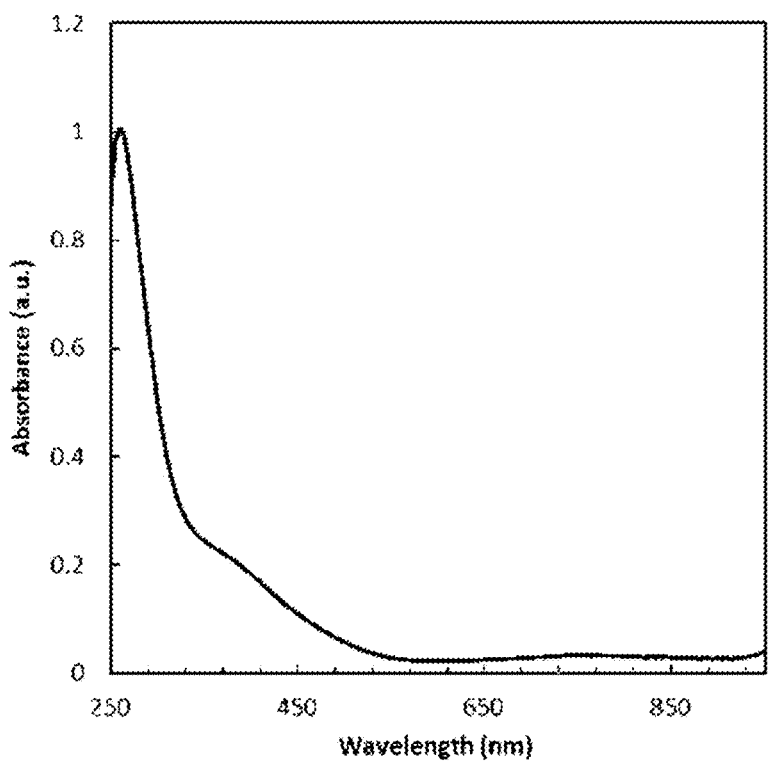
FIG. 21 shows ultraviolet-visible ray absorption (UV-Vis) spectrum of minute particles of synthesized metal copper.

FIG. 21 shows ultraviolet-visible ray absorption (UV-Vis) spectrum of minute particles of the synthesized metal copper. The horizontal axis shows the wavelength [nm], and the vertical axis shows the absorbance [a.u.]. No spectrum peak near 750 nm peculiar to copper oxide (CuO) is observed and the synthesis of copper minute particles can be observed.

Thus, it is found that this example can synthesize minute particles of metal (quantum dots) by reduction of immersing method with a reducing agent.

The resulting copper minute particles are gradually form copper oxide minute particles by oxidizing with oxygen in the air. Therefore, copper oxide minute particles can be synthesized by simply exposing the copper minute particles to oxygen atmosphere such as air. By this process, copper oxide minute particles can be synthesized in the oxygen atmosphere of around room temperature without heat treatment (baking).

The direct reduction of this embodiment can be applied not only to the synthesis of copper minute particles, but also to the synthesis of metal minute particles (quantum dots) such as chromium (Cr), cobalt, by following example 13 or the like.

Moreover, it is effective for stably containing copper minute particles in porous silica to remain a reducing agent such as hydrogen peroxide in the pores of the porous silica. The reducing agent can remain by arranging drying conditions after the immersion to a hydrogen peroxide aqueous solution, for example, to keep the resulting porous silica without drying, or to shorten the drying time. The copper minute particles can stably exist when the reducing agent such as hydrogen peroxide remains in the pores because of the suppression of oxidizing reaction.

Embodiment 8

This embodiment will explain a synthesis of minute particles (quantum dots) by microwave heating treatment.

Example 11

In this example, minute particles (quantum dots) of copper oxide (CuO) are synthesized with porous silica as a template by the microwave heating treatment. The microwave mentioned here is one of categories based on frequencies of electric waves and means a relatively short wavelength range among electric waves. Generally, the microwave refers to an electric wave (electromagnetic wave) of which wavelength is 1 m to 100 μm with a frequency of 300 MHz to 3 THz. A typical irradiation for microwaves includes so-called microwave oven (frequency 2.45 GHz).

In this case, for example, the monolithic porous silica in example A or the like in embodiment 1 was immersed into an aqueous solution (precursor solution) of a metal salt. The concentration of the aqueous solution of the metal salt is preferably from 0.5 M or more. In this example, each of 0.6 M and 3.0 M copper nitrate aqueous solutions was used as the aqueous solution of the metal salt (precursor solution), and monolithic porous silica (pore diameter: 0.7 nm) was immersed therein. During the immersion, air in the pores of the porous silica was released, and the precursor solution was filled therein. The immersion completes when the air is no longer released. After the immersion from about half day to two days, the substitution between air and the precursor solution is completed.

After completion of the immersion, porous silica was removed from the precursor solution, and the outer surface was washed with alcohols such as ethanol. After washing, a microwave irradiation by a microwave oven at 700 W for 15 minutes was carried out to the resulting porous silica. The precursor solution contained in the porous silica was heated by the microwave irradiation and copper oxide minute particles were obtained. The porous silica containing the precursor solution after washing was heated at 450° C. for 1 hour with an electric furnace and a sample for comparison was also obtained.

Figure 22:
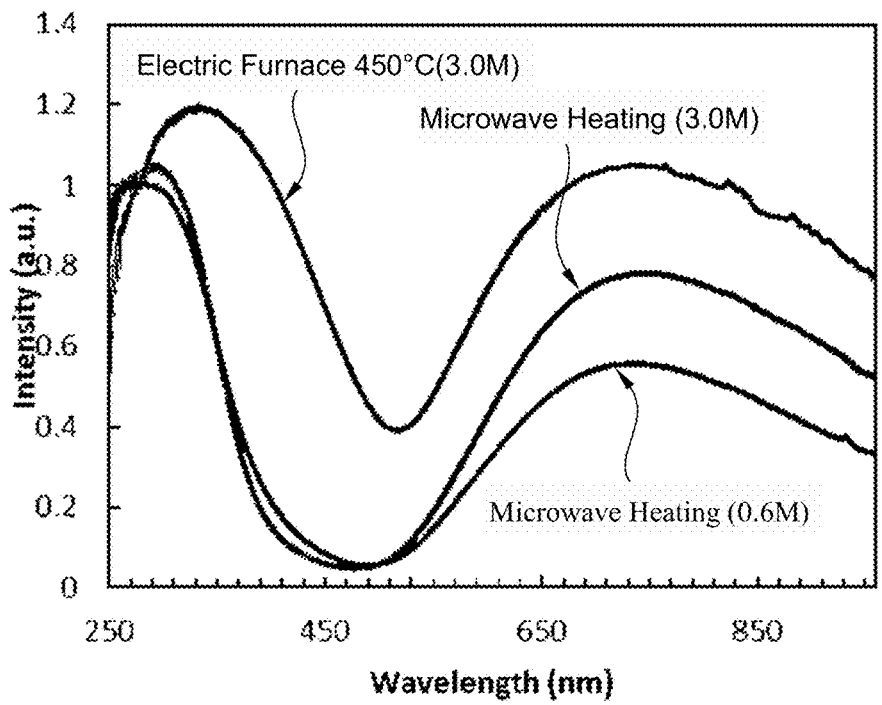
FIG. 22 shows ultraviolet-visible ray absorption (UV-Vis) spectrum of minute particles of synthesized copper oxide.

Ultraviolet-visible ray absorption (UV-Vis) spectrum of each of the synthesized copper oxide minute particles was measured. FIG. 22 shows ultraviolet-visible ray absorption (UV-Vis) spectrum of the synthesized copper oxide minute particles. The horizontal axis of the graph shows the wavelength [nm] and the vertical axis shows the intensity [a.u.]. As shown in FIG. 22, the spectra of minute particles by microwave heating treatment (microwave heating (3.0 M) and (microwave heating (0.6 M)) with using 0.6 M or 3.0 M copper nitrate aqueous solution as the aqueous solution (precursor solution) of metal salt were almost identical between 250 to 450 nm. In contrast, a spectrum peak of minute particles copper oxide (electric furnace 450° C. (3.0 M)) by electric furnace heating treatment with using 3.0 M copper nitrate aqueous solution was exerted between 250 to 450 nm while the peak position was shifted toward the long wavelength side, and "a red shift of the absorption end" was observed.

It is attributed that spherical particles corresponding to the pore diameter of the porous silica cannot be obtained by heating in the electric furnace using a precursor solution with high concentration because minute particles are united (aggregated) and sintered in the pores of porous silica. On the other hand, uniform and highly dispersible spherical particles corresponding to the pore diameter of porous silica can be obtained even using a precursor solution with high concentration by microwave heating because of its quick heating.

Thus, it is found that the synthesis of minute particles of metal oxide contained in porous silica can be obtained even by simple heating means such as microwave heating. Moreover, it is also found that the concentration of the aqueous solution (precursor solution) of the metal salt can be preferably arranged for the heating method.

(Summary)

Figure 23:
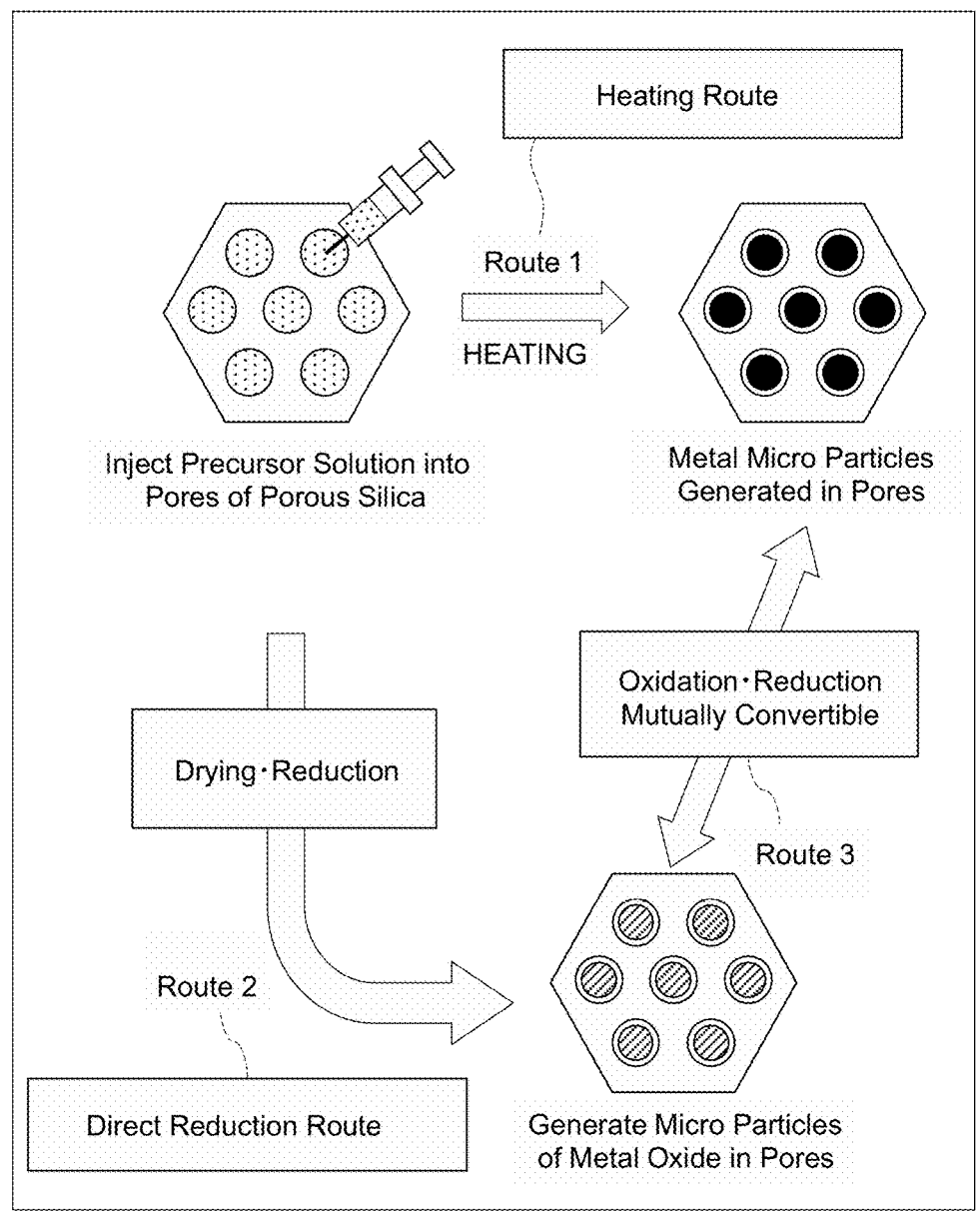
FIG. 23 is a conceptual drawing of synthesis routes of embodiments 4 to 8 (examples 7 to 11).

The synthesis routes described in the above embodiments 4 to 8 (examples 7 to 11) will be collectively described. FIG. 23 is a conceptual drawing showing the synthesis routes of embodiments 4 to 8 (examples 7 to 11).

As shown in FIG. 23, minute particles of the metal oxide can be generated in the pores (route 1; heating route) by injecting the precursor solution (metal salt) into the pores of porous silica and heating. Moreover, minute particles of the metal can be generated in the pores by injecting the precursor solution into the pores of porous silica and drying and reducing, (route 2; direct reducing route). Furthermore, minute particles of the metal can be generated in the pores by reducing the minute particles of the metal oxide in the pores (route 3). Minute particles of the metal oxide can be generated in the pores by oxidizing the minute particles of the metal in the pores (route 3). Thus, the oxidized product/reduced product of route 3 are mutually convertible. Moreover, it can be treated at room temperature by route 2.

The precursor solution may inject into the pores of porous silica by either immersing or penetrating the solution corresponding to the pore volume. Electric furnace heating and microwave heating are effective as heating (baking). The microwave heating is particularly effective to obtain uniform minute particles using the precursor solution with high concentration. The reducing agent for the reducing reaction is required capable of forming the metal oxide into the metal and preventing the minute particles from eluting from the pores, but the kind thereof is not limited. In the above examples, hydrogen peroxide exhibited excellent results. In the oxidizing process, an oxidant such as oxygen can be used. In route 2 (direct reducing route), energy costs can be reduced because each process can be carried out at room temperature.

Embodiment 9

In the above embodiments 4 to 8 (examples 7 to 11), syntheses of copper minute particles and silver as well as copper oxide minute particles have been described; however, in this embodiment, syntheses of minute particles of oxides of other metals (particularly, transition metals) are described.

Example 12

In this example, minute particles (quantum dots) of each of metal oxides of chromium (Cr), manganese (Mn), iron (Fe), cobalt (Co) and nickel (Ni) are synthesized by using porous silica as a template.

In this case, for example, monolithic porous silica in example A or the like of embodiment 1 was immersed in an aqueous solution (precursor solution) of a metal salt. In this example, each of nitrate-salt aqueous solutions of chromium, manganese, iron, cobalt and nickel was used as the aqueous solution (precursor solution) of the metal salt. The concentration of each of the nitrate-salt aqueous solutions was 0.5 M.

Monolithic porous silica (pore diameter: 0.8 to 3.0 nm) was immersed in each of the nitrate-salt aqueous solutions. During the immersion, air in the pores of the porous silica was released, and the precursor solution was filled therein. The immersion completes when the air is no longer released. After the immersion from about half day to two days, the substitution between air and the precursor solution is completed.

After completion of the immersion, porous silica was removed from the nitrate-salt aqueous solution, and the outer surface was washed with alcohols such as ethanol. After washing, a microwave irradiation by a microwave oven at 700 W for 15 minutes was carried out to the resulting porous silica. The nitrate-salt aqueous solution contained in the porous silica was heated by the microwave irradiation and minute particles of the corresponding metal oxides, that is, minute particles of each of oxides of chromium, manganese, iron, cobalt and nickel were obtained.

Figure 24:
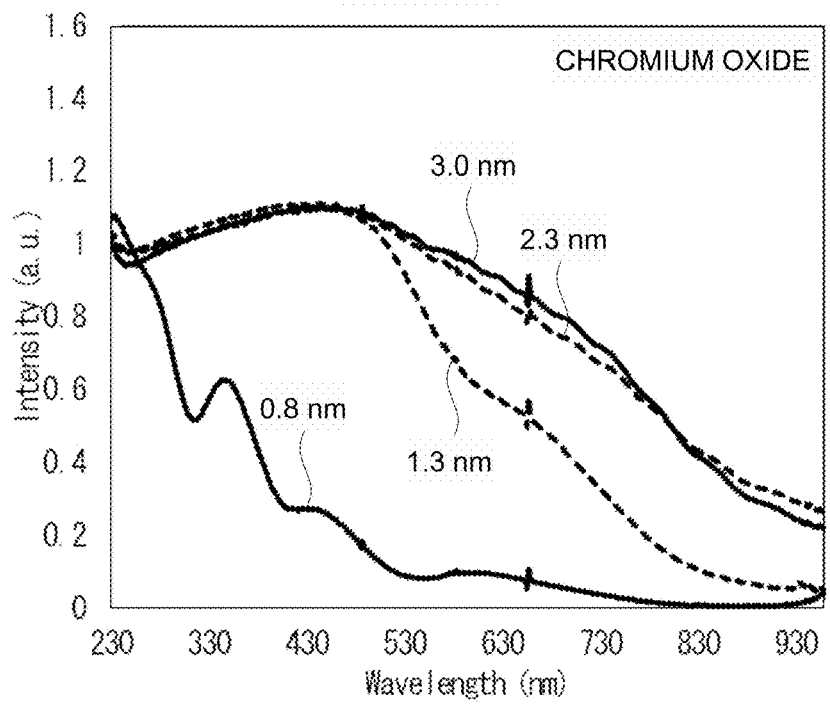
FIG. 24 shows ultraviolet-visible ray absorption (UV-Vis) spectrum of minute particles of synthesized metal chromium oxide.
Figure 25:
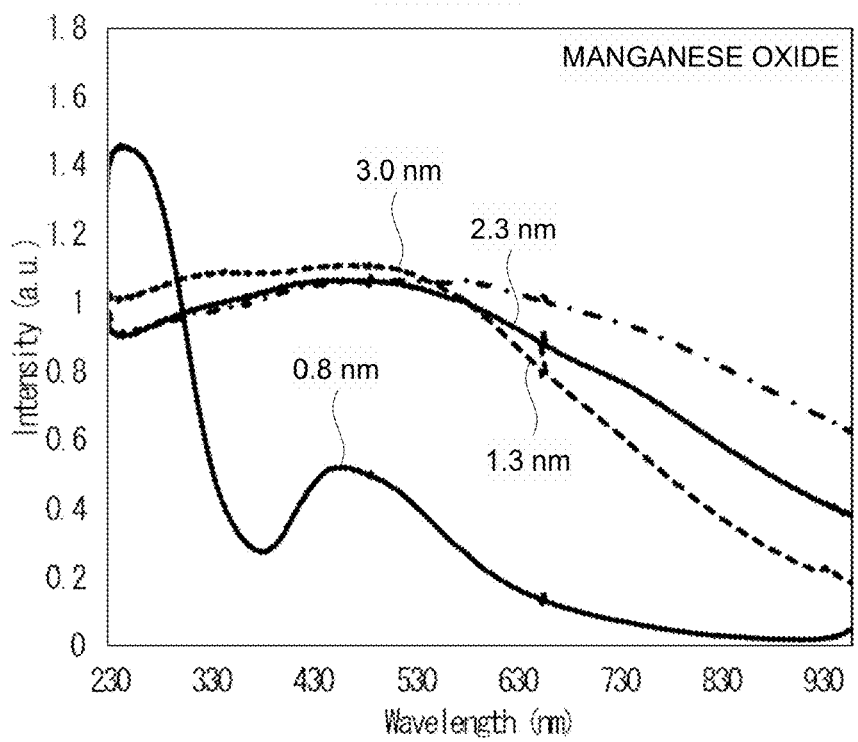
FIG. 25 shows ultraviolet-visible ray absorption (UV-Vis) spectrum of minute particles of synthesized manganese oxide.
Figure 26:
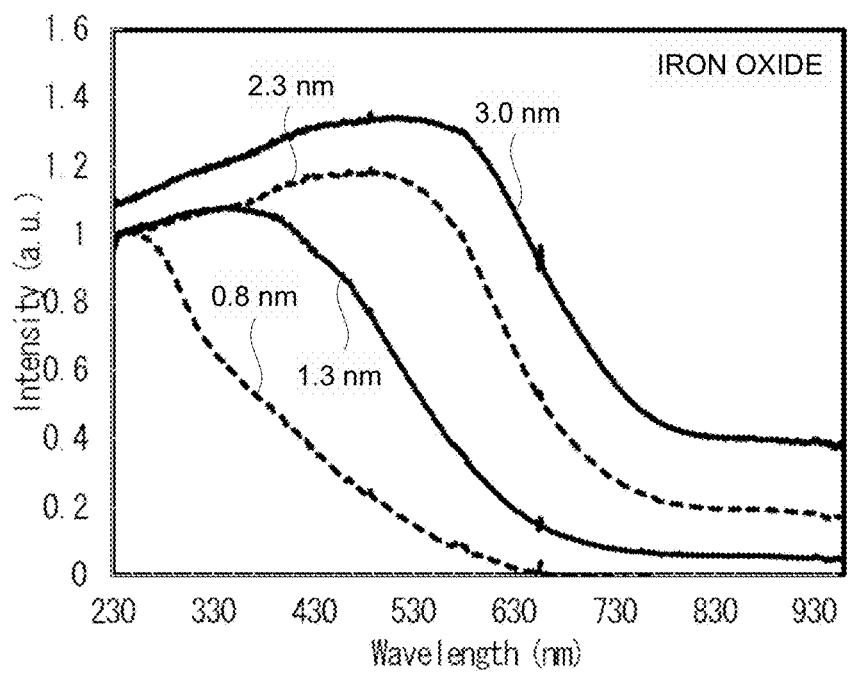
FIG. 26 shows ultraviolet-visible ray absorption (UV-Vis) spectrum of minute particles of synthesized iron oxide.
Figure 27:
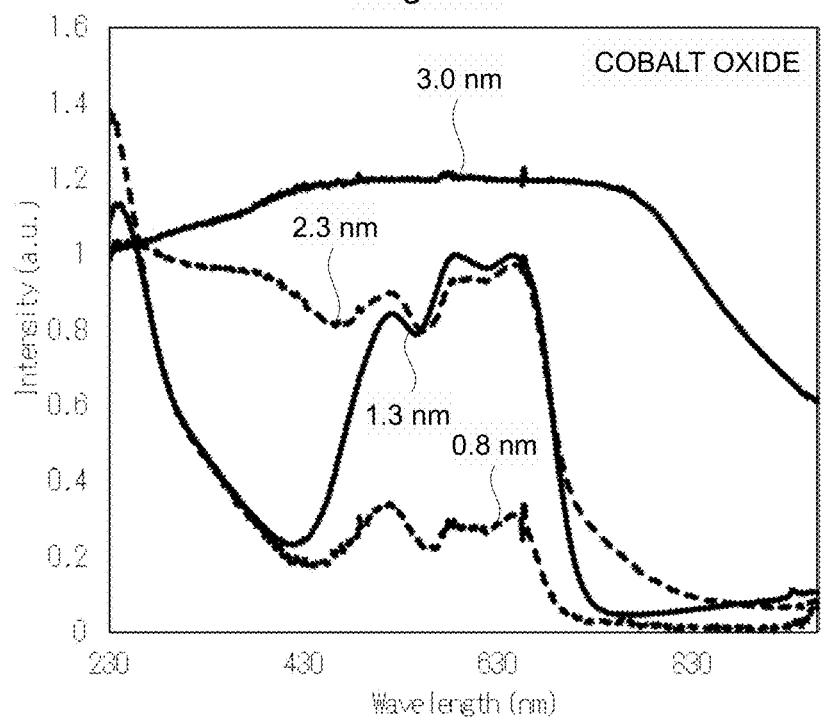
FIG. 27 shows ultraviolet-visible ray absorption (UV-Vis) spectrum of minute particles of synthesized cobalt oxide.
Figure 28:
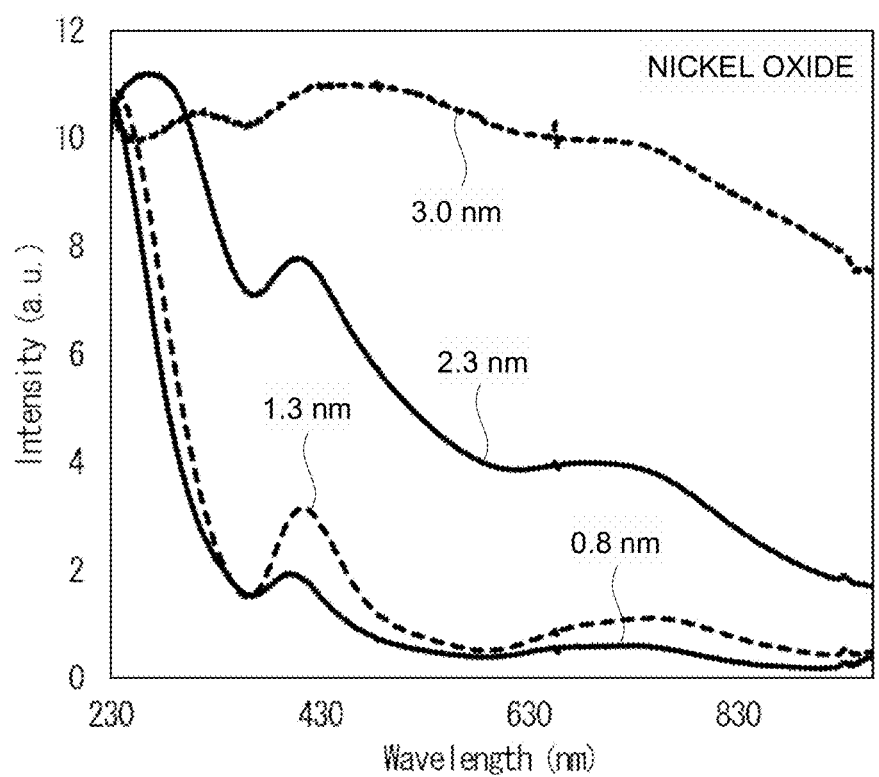
FIG. 28 shows ultraviolet-visible ray absorption (UV-Vis) spectrum of minute particles of synthesized nickel oxide.

Ultraviolet-visible ray absorption (UV-Vis) spectrum of minute particles of each of the metal oxides were measured (FIGS. 24 to 28). FIG. 24 shows ultraviolet-visible ray absorption (UV-Vis) spectrum of the synthesized chromium oxide minute particles. FIG. 25 shows ultraviolet-visible ray absorption (UV-Vis) spectrum of the synthesized minute particles of manganese oxide. FIG. 26 shows ultraviolet-visible ray absorption (UV-Vis) spectrum of the synthesized iron oxide minute particles. FIG. 27 shows ultraviolet-visible ray absorption (UV-Vis) spectrum of the synthesized cobalt oxide minute particles. FIG. 28 shows ultraviolet-visible ray absorption (UV-Vis) spectrum of the synthesized nickel oxide minute particles. In each figure, the horizontal axis of the graph shows the wavelength [nm] and the vertical axis shows the intensity [a.u.]. Moreover, subscripts of each graph show pore diameters (nm).

As shown in FIGS. 24 to 28, the quantum size effect derived from the reduction of the pore diameter was observed in any metal oxides. Particularly, the quantum size effect was remarkably observed in the sub-nano range (pore diameter of less than 1 nm).

Table 4 shows visual colors of the resulting metal oxides. The color of an oxide of copper (Cu) described in embodiment 4 (example 7) is shown in Table 4 as well as the colors of oxides of chromium (Cr), manganese (Mn), iron (Fe), cobalt (Co) and nickel (Ni).

As shown in FIG. 4, color changes in any metal oxides were observed by reducing the pore diameter of silica serving as a template.

TABLE 4

| black | black | dark brown~ black | dark brown~ black | dark brown | deep green | 3 nm |
|---|---|---|---|---|---|---|
| dark brown | dark brown~ black | brown | navy | brown | green | 2.5 nm |
| dark red | brown | orange | blue | yellow | blue | 1.3 nm |
| light yellow | pink | light orange | light blue | light yellow | aqua blue | 0.8 nm |
| Cr | Mn | Fe | Co | Ni | Cu | pore diameter metal element forming oxide |

Embodiment 10

In the above embodiments 4 to 8 (examples 7 to 11), syntheses of copper and silver minute particles and copper oxide minute particles were described and in this embodiment, syntheses of minute particles of oxides of other metals (particularly, transition metals) are described. Particularly, the metal minute particles are synthesized by reducing minute particles (quantum dots) of the metal oxide contained in porous silica described in embodiment 9 (example 12).

Example 13

In this example, minute particles of metal are synthesized by reducing minute particles (quantum dots) of metal oxide contained in porous silica and synthesized in example 12. For example, a hydrogen peroxide aqueous solution may be used as a reducing agent.

In this case, minute particles (quantum dots) of metals chromium (Cr), manganese (Mn), iron (Fe), cobalt (Co) and nickel (Ni), which were obtained by immersing these in a 15% hydrogen peroxide aqueous solution was obtained as a precursor of the minute particles of an oxide of each of chromium (Cr), manganese (Mn), iron (Fe), cobalt (Co) and nickel (Ni), which were synthesized in example 12.

Figure 29:
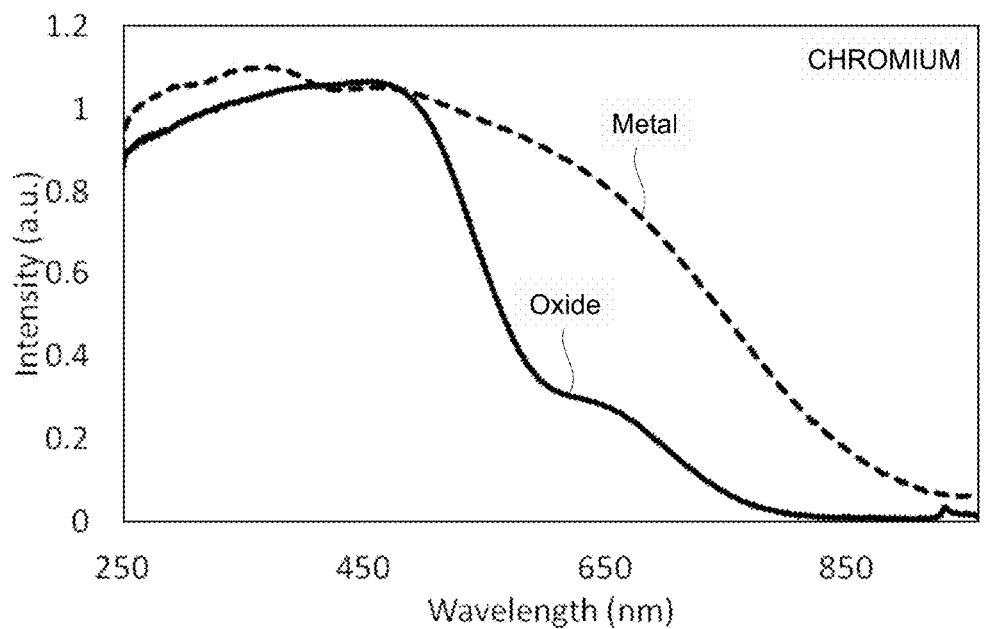
FIG. 29 shows ultraviolet-visible ray absorption (UV-Vis) spectra of minute particles of an oxide of chromium and minute particles of the metal.
Figure 30:
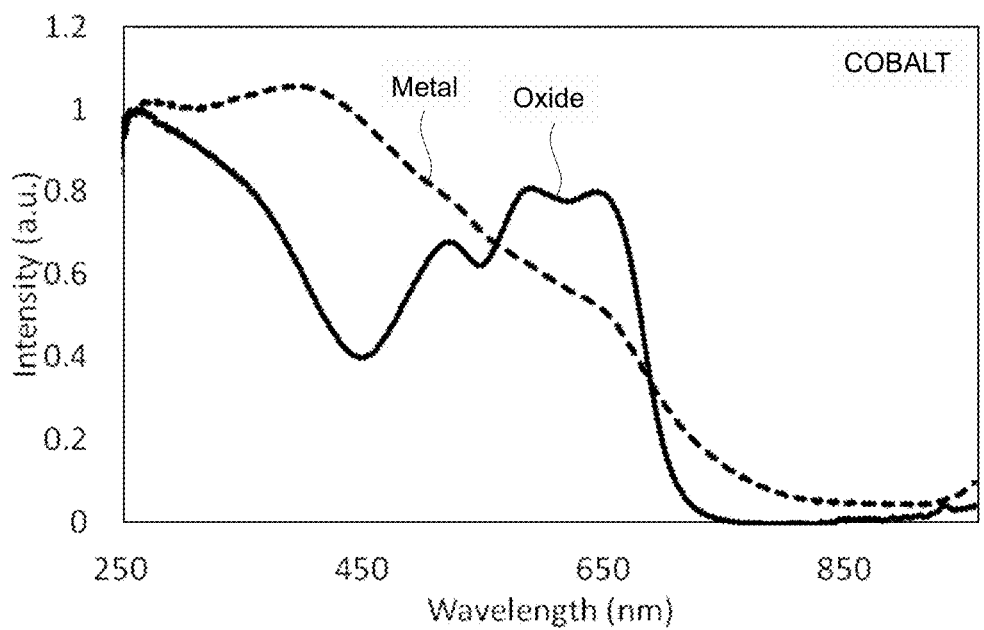
FIG. 30 shows ultraviolet-visible ray absorption (UV-Vis) spectra of minute particles of an oxide of cobalt and minute particles of the metal.

FIG. 29 shows ultraviolet-visible ray absorption (UV-Vis) spectra of the chromium oxide minute particles and the metal minute particles. FIG. 30 shows ultraviolet-visible ray absorption (UV-Vis) spectra of the cobalt oxide minute particles and the metal minute particles. The horizontal axis of the graph shows the wavelength [nm] and the vertical axis shows the intensity [a.u.]. In FIGS. 29 and 30, porous silica with a pore diameter of 0.8 nm was used as a template. As shown in FIGS. 29 and 30, a great change in spectra was observed between the oxide and the metal.

Some metals are easily re-oxidized but others are not. Cobalt is hardly re-oxidized while chromium tends to be easily re-oxidized. In both cases, the metal can be stably maintained by remaining a reducing agent in the pores of porous silica.

Embodiment 11

This embodiment will describe synthesis of minute particles (quantum dots) of carbon by using porous silica as a template. After grinding porous silicas in a mortar into powder, an aqueous solution of glucose was added in example 4 of embodiment 1, but monolithic porous silica was immersed in an aqueous solution of citric acid in the example 14.

Example 14

In this example, minute particles (quantum dots) of carbon are synthesized by using porous silica as a template.

In this case, for example, monolithic porous silica (pore diameter: 1.1 and 2.8 nm) in example A or the like of embodiment 1 was immersed in a 0.6 M citric acid aqueous solution. During the immersion, air in the pores of the porous silica was released, and the precursor solution was filled therein. The immersion completes when the air is no longer released. After the immersion from about half day to two days, the substitution between air and the precursor solution is completed.

After completion of the immersion, porous silica was removed from the nitrate-salt aqueous solution, and the outer surface was washed with alcohols such as ethanol. After washing, the resulting porous silica was dried and baked and carbon minute particles of were synthesized. In this example, citric acid in the pores of the porous silica was carbonized by baking at 300° C. in the air for 1 hour with an electric furnace and carbon minute particles was obtained.

Figure 31:
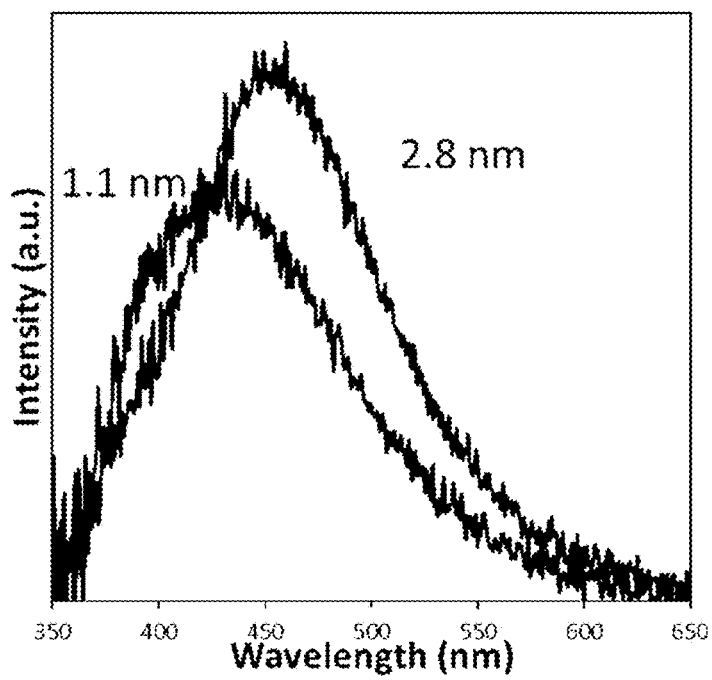
FIG. 31 shows a light-emission spectrum (Ex. 340 nm) of minute particles of the resulting carbon.
Figure 32:
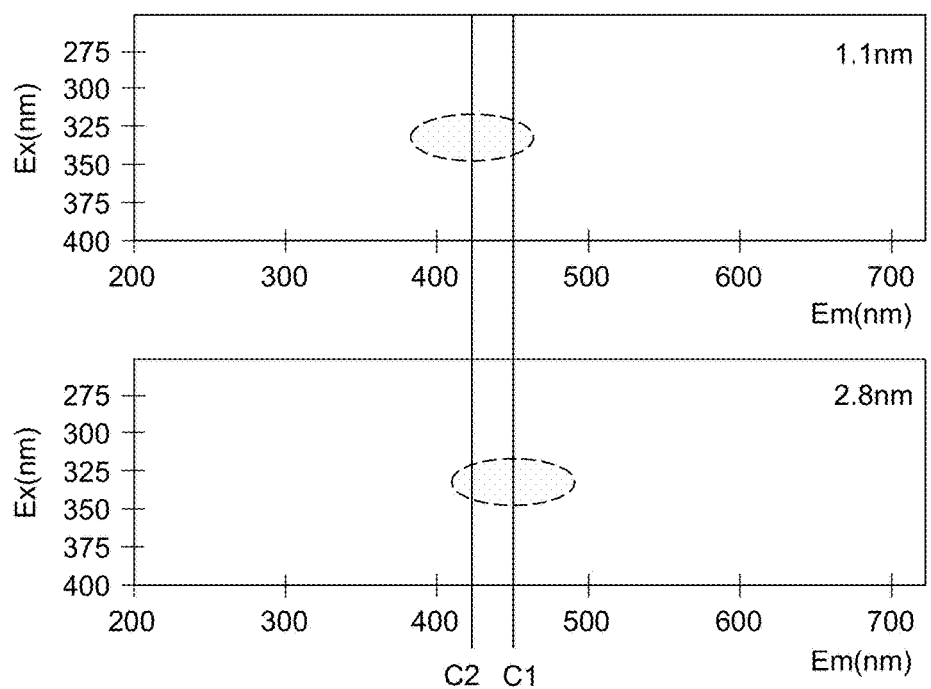
FIG. 32 shows a light-emission spectrum of minute particles of the resulting carbon.

FIG. 31 shows a light-emission spectrum (Ex. 340 nm) of the resulting carbon minute particles. The horizontal axis of the graph shows the wavelength [nm] and the vertical axis shows the intensity [a.u.]. Subscripts in each graph indicate pore diameters (nm). FIG. 32 shows light-emission spectra of the resulting carbon minute particles. The horizontal axis shows the excited wavelength (Em, [nm]) and the vertical axis shows the light-emission wavelength (Ex, [nm]). The light-emission spectrum on the upper side of FIG. 32 was derived from the porous silica of the pore diameter of 1.1 nm, and the light-emission spectrum on the lower side was derived from that of the pore diameter of 2.8 nm. In FIG. 32, regions surrounded by broken lines represent strong light-emission portions, and the centers (excited wavelengths) of them are indicated by lines C1 and C2.

As shown in FIG. 31, it was found that the peak of intensity was changed by changing the pore diameter (2.8→1.1 nm). As shown in FIG. 32, it was found that the strong light-emission portions were exhibited by changing the pore diameter (2.8→1.1 nm) with change of the centers from C1 to C2.

Thus, it was found that the light-emission wavelength was changed by changing the pore diameter. That is, the light-emission wavelength is controlled by changing the pore diameter. In other words, the light-emission wavelength of minute particles can be adjusted by controlling the pore diameter (average pore diameter) of porous silica. Smaller carbon minute particles can be synthesized by reducing the pore diameter, and the light-emission wavelength is shifted toward the short wavelength side. In visual observation, a blue-color light emission was observed from carbon minute particles formed by using porous silica with a pore diameter of 1.1 nm as a template, and a yellowish green light emission was observed from carbon minute particles formed by using porous silica with a pore diameter of 2.8 nm as a template.

As described above, the invention of the present inventors was described specifically based on embodiments; however, the present invention is not limited by the embodiments, and needless to say, various modifications may be included within a scope of the gist of the present invention.

The present invention relates to a method for producing a particle containing porous silica; the porous silica; and a particle containing the porous silica, and this method is, particularly, effectively applicable to technique for introducing minute particles into the pores using porous silica with micro pores.

What is claimed is:

1. A method for producing a particle containing porous silica comprising the following steps:
   (a) producing porous silica by hydrolysis of alkoxy silane comprising the following steps:
      (a1) mixing a surfactant and an alkoxy silane to form a mixed solution;
      (a2) hydrolyzing the alkoxy silane by adding water to the mixed solution; and
      (a3) removing the surfactant by heat treatment after the (a2) process;
   (b) synthesizing the particle in the pores of porous silica produced in the step (a), and,
   (c) removing the porous silica and obtaining a metallic oxide after the step (b),
   wherein the step (b) is contacting the porous silica with solution or gas containing a compound comprising the metal of the metallic oxide as a component element to introduce pores of the porous silica with the solution or gas, and forming the particle containing the metallic oxide in the pores of the porous silica by heat treatment,
   wherein the surfactant is a cationic surfactant of which carbon atoms of a hydrophobic group is 2 to 7,
   wherein in the step (a2), silica is formed by the hydrolysis with micelle of the surfactant used as a template under a condition of a stoichiometric ratio of alkoxy silane: water=1:n, the amount of water is an amount in which n is 2 to 4; and, pH value of the water is 0 to 2, and
   an average pore diameter of the porous silica is 0.5 nm or more to 1.5 nm or less.

2. The method according to claim 1, wherein producing porous silica by hydrolysis of alkoxy silane further comprises a step of adding an organic silane compound.

3. The method according to claim 1, wherein the heat treatment in the step (a3) is heat treatment at 600° C. for at least 3 hours.

* * * * *